United States Patent
Yamamoto et al.

(10) Patent No.: US 12,114,333 B2
(45) Date of Patent: Oct. 8, 2024

(54) INTEGRATED CIRCUIT

(71) Applicant: Sun Patent Trust, New York, NY (US)

(72) Inventors: Tetsuya Yamamoto, Kanagawa (JP); Chi Gao, Beijing (CN); Hidetoshi Suzuki, Kanagawa (JP); Seigo Nakao, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 18/491,608

(22) Filed: Oct. 20, 2023

(65) Prior Publication Data

US 2024/0049247 A1  Feb. 8, 2024

Related U.S. Application Data

(63) Continuation of application No. 18/161,548, filed on Jan. 30, 2023, now Pat. No. 11,838,927, which is a
(Continued)

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04L 5/0055* (2013.01);
(Continued)

(58) Field of Classification Search
CPC ............. H04W 72/04; H04W 72/0446; H04W 72/048; H04W 72/042; H04L 5/0053; H04L 5/0092; H04L 5/0055; H04L 5/00
See application file for complete search history.

(56) References Cited

U.S. PATENT DOCUMENTS

| | | |
|---|---|---|
| 8,422,532 B2 | 4/2013 | Nakao et al. |
| 8,976,660 B2 | 3/2015 | Kang et al. |

(Continued)

FOREIGN PATENT DOCUMENTS

| | | |
|---|---|---|
| CN | 101902782 A | 12/2010 |
| CN | 103095395 A | 5/2013 |

(Continued)

OTHER PUBLICATIONS

3GPP TR 36.888 V12.0.0, "3rd Generation Partnership Project; Technical Specification Group Radio Access Network; Study on provision of low cost Machine-Type Communications (MTC) User Equipments (UEs) based on LTE (Release 12)," Jun. 2013, 55 pages.

(Continued)

*Primary Examiner* — Kyaw Z Soe
(74) *Attorney, Agent, or Firm* — Seed IP Law Group LLP

(57) ABSTRACT

Disclosed is an integrated circuit to control a process for a terminal. The process includes: receiving downlink control information and downlink data; determining, based on the downlink control information and an offset, a physical uplink control channel (PUCCH) resource used for transmission of a response signal for the downlink data; and transmitting the response signal using the determined PUCCH resource. A first offset is used as the offset when the terminal is configured in a coverage enhancement mode, in which the response signal is allowed to be transmitted repeatedly for one of plural repetition levels in a plurality of subframes, where the first offset is configured for each of the plural repetition levels. The first offset is different from a second offset, which is used when the terminal is not configured in the coverage enhancement mode.

22 Claims, 17 Drawing Sheets

Related U.S. Application Data continuation of application No. 17/533,981, filed on Nov. 23, 2021, now Pat. No. 11,606,785, which is a continuation of application No. 16/838,810, filed on Apr. 2, 2020, now Pat. No. 11,219,012, which is a continuation of application No. 15/316,489, filed as application No. PCT/CN2014/080628 on Jun. 24, 2014, now Pat. No. 10,652,871.

(51) Int. Cl.
  *H04W 72/0446* (2023.01)
  *H04W 72/51* (2023.01)
(52) U.S. Cl.
  CPC ....... *H04L 5/0092* (2013.01); *H04W 72/0446* (2013.01); *H04W 72/51* (2023.01)

(56) References Cited

U.S. PATENT DOCUMENTS

| | | | |
|---|---|---|---|
| 9,055,569 | B2 | 6/2015 | Nam et al. |
| 9,337,984 | B2 | 5/2016 | Kim et al. |
| 9,369,998 | B2 | 6/2016 | Park et al. |
| 9,578,628 | B2 | 2/2017 | Zhong et al. |
| 2010/0232473 | A1 | 9/2010 | Nakao et al. |
| 2012/0002631 | A1 | 1/2012 | Nishio et al. |
| 2013/0028214 | A1* | 1/2013 | Imamura ............. H04W 52/346 370/329 |
| 2013/0150109 | A1 | 6/2013 | Takano |
| 2014/0098761 | A1* | 4/2014 | Lee ....................... H04L 5/0055 370/329 |
| 2014/0164864 | A1 | 6/2014 | Takeda et al. |
| 2014/0211729 | A1 | 7/2014 | Darwood et al. |
| 2015/0043476 | A1 | 2/2015 | Takeda et al. |
| 2015/0078224 | A1 | 3/2015 | Xiong et al. |
| 2015/0117410 | A1 | 4/2015 | Wu et al. |
| 2015/0131579 | A1* | 5/2015 | Li ........................ H04L 1/1858 370/329 |
| 2015/0173063 | A1 | 6/2015 | Oizumi et al. |
| 2016/0057784 | A1 | 2/2016 | You et al. |
| 2016/0128029 | A1 | 5/2016 | Yang et al. |
| 2016/0143017 | A1 | 5/2016 | Yang et al. |
| 2016/0242212 | A1 | 8/2016 | Wong et al. |
| 2016/0337089 | A1 | 11/2016 | Chen et al. |
| 2016/0353440 | A1 | 12/2016 | Lee et al. |
| 2017/0019216 | A1 | 1/2017 | Li |
| 2017/0048802 | A1 | 2/2017 | Bucknell et al. |
| 2017/0055249 | A1 | 2/2017 | Yasukawa et al. |
| 2018/0167170 | A1 | 6/2018 | Kim et al. |

FOREIGN PATENT DOCUMENTS

| | | |
|---|---|---|
| CN | 103141144 A | 6/2013 |
| CN | 103703714 A | 4/2014 |
| EP | 2 603 030 A1 | 6/2013 |
| JP | 2014-042360 A | 3/2014 |
| WO | 2009/041029 A1 | 4/2009 |
| WO | 2011/077743 A1 | 6/2011 |
| WO | 2012/098827 A1 | 7/2012 |
| WO | 2013/141214 A1 | 9/2013 |
| WO | 2013/168405 A1 | 11/2013 |
| WO | 2014/020851 A1 | 2/2014 |

OTHER PUBLICATIONS

3GPP TS 36.211 V11.5.0, "3rd Generation Partnership Project; Technical Specification Group Radio Access Network; Evolved Universal Terrestrial Radio Access (E-UTRA); Physical channels and modulation (Release 11)," Dec. 2013, 120 pages.

3GPP TS 36.212 V11.4.0, "3rd Generation Partnership Project; Technical Specification Group Radio Access Network; Evolved Universal Terrestrial Radio Access (E-UTRA); Multiplexing and channel coding (Release 11)," Dec. 2013, 84 pages.

3GPP TS 36.213 V11.5.0, "3rd Generation Partnership Project; Technical Specification Group Radio Access Network; Evolved Universal Terrestrial Radio Access (E-UTRA); Physical layer procedures (Release 11)," Dec. 2013, 182 pages.

Extended European Search Report, dated Jun. 8, 2017, for corresponding European Application No. 14896013.1-1875 / 3162139, 11 pages.

Huawei, HiSilicon, "Considerations on PRACH repetition levels and power adjustment of PRACH transmission," R1-140026, Agenda Item: 7.2.2.2.2, 3GPP TSG RAN WG1 Meeting #76, Prague, Czech Republic, Feb. 10-14, 2014, 6 pages.

Huawei, HiSilicon, "Discussion on issues for PUCCH coverage improvement," R1-140029, Agenda Item: 7.2.2.2.3, 3GPP TSG RAN WG1 Meeting #76, Prague, Czech Republic, Feb. 10-14, 2014, 4 pages.

Indian Examination Report dated May 6, 2020 for the corresponding Indian Application No. 201627040812, 7 pages.

Intel Corporation, "Coverage Improvement for (E)PDCCH and PUCCH," R1-140116, Agenda item: 7.2.2.2.3, 3GPP TSG-RAN WG1 #76, Prague, Czech Republic, Feb. 10-14, 2014, 7 pages.

Intel Corporation, "Details on PDSCH scheduling for low cost MTC UE," R1-141147, Agenda item: 7.2.2.1, 3GPP TSG-RAN WG1 #76bis, Shenzhen, China, Mar. 31-Apr. 4, 2014, 8 pages.

International Search Report dated Mar. 30, 2015, for corresponding International Application No. PCT/CN2014/080628, 2 pages.

Itri, "HARQ resource collision issue in TDD eIMTA system," R1-135411, Agenda Item: 6.2.1.3, 3GPP TSG RAN WG1 Meeting #75, San Francisco, USA, Nov. 11-15, 2013, 3 pages.

LG Electronics, "UL channel transmission for MTC coverage enhancement," R1-140308, Agenda Item: 7.2.2.2.3, 3GPP TSG RAN WG1 #76, Prague, Czech Republic, Feb. 10-14, 2014, 5 pages.

LG Electronics, Fujitsu, Huawei, HiSilicon, InterDigital, Nokia, NSN, Panasonic, Qualcomm, "Way Forward on PUCCH enhancement for CoMP," R1-121860, Agenda item: 7.5.6.3, 3GPP TSG RAN WG1 #68bis, Jeju, Korea, Mar. 26-30, 2012, 5 pages.

Malaysian Examination Report, mailed Sep. 20, 2021, for Malaysian Application No. PI 2016704402, 3 pages.

Nakao et al., "Performance enhancement for E-UTRA uplink control channel in fast fading environments," IEEE, Next-Generation Mobile Communications Development Center, 2009, 5 pages.

Xiong et al., "On Uplink HARQ Timing for MTC UES in Enhanced Coverage Mode," U.S. Appl. No. 61/933,869, filed Jan. 30, 2014, 8 pages.

Zte, "Discussion on Control Channel Coverage Improvement," R1-135360, 3GPP TSG RAN WG1 Meeting #75, Agenda Item: 6.2.2.2.3, San Francisco, USA, Nov. 11-15, 2013, 6 pages.

Zte, "Discussion on PUCCH Coverage Improvement," R1-140275, Agenda item: 7.2.2.2.3, 3GPP TSG RAN WG1 Meeting #76, Prague, Czech Republic, Feb. 10-14, 2014, 4 pages.

* cited by examiner

INTEGRATED CIRCUIT

TECHNICAL FIELD

The present disclosure relates to a terminal, a base station, a transmission method, and a reception method.

BACKGROUND ART

3rd Generation Partnership Project Long Term Evolution (3GPP LTE) adopts Orthogonal Frequency Division Multiple Access (OFDMA) as a downlink communication scheme.

In radio communication systems to which 3GPP LTE is applied, a base station (hereinafter, may be referred to as "eNB") transmits a synchronization signal (i.e., Synchronization Channel: SCH) and a broadcast signal (i.e., Physical Broadcast Channel: PBCH) using a predetermined communication resource. Each terminal (hereinafter, may be referred to as "UE" (User Equipment)) finds the SCH, first and thereby ensures synchronization with the base station. Subsequently, the terminal reads BCH information to acquire a base station-specific parameter (e.g., frequency bandwidth) (e.g., see, Non-Patent Literature (hereinafter, abbreviated as "NPL") 1, 2 and 3).

In addition, upon completion of the acquisition of the base station-specific parameter, each terminal makes a connection request to the base station to thereby establish a communication link with the base station. The base station transmits control information via a control channel such as Physical Downlink Control Channel (PDCCH) as appropriate to the terminal with which the communication link has been established. The terminal performs "blind-determination" on each of a plurality of pieces of control information included in the received PDCCH signal. More specifically, each of the pieces of control information includes a Cyclic Redundancy Check (CRC) part and the base station masks this CRC part using the terminal ID of the transmission target terminal. Accordingly, until the terminal demasks the CRC part of the piece of the received control information with its own terminal ID, the terminal cannot determine whether or not the piece of control information is intended for the terminal. In this blind-determination, if the result of demasking of the CRC part indicates that the CRC operation is OK, the piece of control information is determined as being intended for the terminal.

Moreover, in LTE, Hybrid Automatic Repeat Request (HARQ) is applied to downlink data to terminals from a base station. More specifically, each terminal feeds back a response signal indicating the result of error detection on the downlink data to the base station. Each terminal performs a CRC on the downlink data and feeds back an Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to send the response signal (i.e., ACK/NACK signal) as feedback.

The control information to be transmitted from the base station herein includes resource allocation information including information on a resource allocated to the terminal by the base station. As described above, PDCCH is used to transmit this control information. This PDCCH includes one or more L1/L2 control channels (L1/L2 CCH). Each L1/L2 CCH includes one or more Control Channel Elements (CCE). More specifically, a CCE is the basic unit used to map the control information to PDCCH. Moreover, when a single L1/L2 CCH includes a plurality of CCEs, contiguous CCEs are allocated to the L1/L2 CCH. The base station assigns the L1/L2 CCH to the resource allocation target terminal in accordance with the number of CCEs required for indicating the control information to the resource allocation target terminal. The base station maps the control information to a physical resource corresponding to the CCE of the L1/L2 CCH to transmit the control information.

In addition, CCEs are associated with PUCCH component resources (hereinafter, referred to as "PUCCH resource") in one-to-one correspondence. Accordingly, a terminal that has received an L1/L2 CCH identifies the PUCCH resources corresponding to the CCEs forming the L1/L2 CCH and transmits an ACK/NACK signal to the base station using the identified PUCCH resources. However, when the L1/L2 CCH occupies contiguous CCEs, the terminal transmits an ACK/NACK signal to the base station using one PUCCH resource among the plurality of PUCCH resources respectively corresponding to the CCEs (e.g., PUCCH resource corresponding to a CCE having the smallest index).

As illustrated in FIG. 1, the transmission timing of an ACK/NACK signal on PUCCH from a terminal is in or after a K-th subframe from a subframe in which the received PDCCH signal and Physical Downlink Shared Channel (PDSCH) to which data is assigned by the PDDCH signal are received (i.e., subframe n in FIG. 1) (e.g., K=4 in Frequency Division Duplex (FDD) (i.e., subframe n+K in FIG. 1).

A plurality of ACK/NACK signals transmitted from a plurality of terminals are spread using a Zero Auto-correlation (ZAC) sequence having the characteristics of zero auto-correlation in time-domain, a Walsh sequence and a discrete Fourier transform (DFT) sequence, and are code-multiplexed in PUCCH as illustrated in FIG. 2. In FIG. 2, W(0), W(1), W(2), W(3) represent a length-4 Walsh sequence and F(0), F(1), F(2) represent a length-3 DFT sequence.

As illustrated in FIG. 2, in the terminals, ACK/NACK signals are primary-spread over frequency components corresponding to 1 Single-Carrier Frequency Division Multiple Access (1SC-FDMA) symbol by a ZAC sequence (length-12) on frequency-domain first. In other words, the length-12 ZAC sequence is multiplied by an ACK/NACK signal component represented by a complex number. Subsequently, the primary-spread ACK/NACK signals and a ZAC sequence serving the reference signals are secondary-spread using a Walsh sequence (length-4: W(0) to W(3)) and a DFT sequence (length-3: F(0) to F(2)). More specifically, each component of the length-12 sequence signal (i.e., primary-spread ACK/NACK signals or a ZAC sequence serving as reference signals) is multiplied by each component of an orthogonal code sequence (i.e., Walsh sequence or DFT sequence). Moreover, the secondary-spread signals are transformed into a length-12 sequence signal in the time-domain by inverse discrete Fourier transform (IDFT) (or inverse fast Fourier transform (IFFT)). A cyclic prefix (CP) is added to each signal obtained by the IFFT, and a signal of one slot consisting of seven SC-FDMA symbols is thus formed.

PUCCH is mapped to both ends of a system band in the frequency domain. In PUCCH, a radio resource is allocated to each terminal in units of subframes. Each subframe consists of two slots, and for PUCCH, frequency hopping is applied between the first slot and last slot (inter-slot frequency hopping).

ACK/NACK signals from different terminals are spread using ZAC sequences corresponding different cyclic shift values (i.e., cyclic shift index) or orthogonal code sequences corresponding to different sequence numbers (i.e., orthogonal cover index (OC index)). An orthogonal code sequence is a combination of a Walsh sequence and a DFT sequence. In addition, the orthogonal code sequence is referred to as a block-wise spreading code in some cases. Thus, base stations can demultiplex the code-multiplexed ACK/NACK signals, using the conventional despreading and correlation processing (e.g., see, NPL 4). FIG. 3 illustrates PUCCH resources defined by sequence numbers of orthogonal code sequences (OC index: 0 to 2) and cyclic shift values (i.e., cyclic shift index: 0 to 11) of a ZAC sequence. When a length-4 Walsh sequence and a length-3 DFT sequence are used, a single subcarrier includes a maximum of 36 PUCCH resources (3*12=36). However, it is not always true that the 36 PUCCH resources are all made available. For example, FIG. 3 illustrates a case where 18 PUCCH resources (#0 to #17) are made available.

It is worth noting that, as an infrastructure to support the future information society, Machine-to-Machine (M2M) communication, which enables a service using inter-device autonomous communication without involving user judgment, has been considered as a promising technology in recent years. Smart grid is a specific application example of the M2M system. Smart grid is an infrastructure system that efficiently supplies a lifeline such as electricity or gas, performs M2M communication between a smart meter provided in each home or building and a central server, and autonomously and efficiently brings supply and demand for resources into balance. Other application examples of the M2M communication system include a monitoring system for goods management or remote medical care, or remote inventory or charge management of vending machines.

In the M2M communication system, use of a cellular system supporting a broad range of a communication area is particularly attracting attention. In 3GPP, studies on M2M in the cellular network have been carried out in LTE and LTE-Advanced standardization under the title of "Machine Type Communication (MTC)." In particular, "Coverage Enhancement," which further extends the communication area, has been studied in order to support a case where an MTC communication device is installed at a location not usable in the current communication area, such as a smart meter in the basement of a building (e.g., see NPL 5).

In the MTC coverage enhancement, in particular, a technique called "repetition" that repeatedly transmits the same signal multiple times is considered as an important technique for extending the communication area. More specifically, repetition transmission is expected to be performed on channels such as PDCCH, PDSCH, and PUCCH.

CITATION LIST

Non-Patent Literature

NPL 1
3GPP TS 36.211 V11.5.0, "Physical channels and modulation (Release 11)," December 2013
NPL 2
3GPP TS 36.212 V11.4.0, "Multiplexing and channel coding (Release 11)," December 2013
NPL 3
3GPP TS 36.213 V11.5.0, "Physical layer procedures (Release 11)," December 2013
NPL 4
Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009
NPL 5
3GPP TR 36.888 V12.0.0, "Study on provision of low-cost Machine-Type Communications (MTC) User Equipments (UEs) based on LTE," June 2013

SUMMARY OF INVENTION

Technical Problem

Studies have not been sufficiently carried out yet on PUCCH resources for transmitting ACK/NACK signals from MTC coverage enhancement mode terminals (i.e., terminals that perform repetition transmission), however. In particular, in a case where an MTC coverage enhancement mode terminal and a normal mode terminal (terminal that does not perform repetition transmission) coexist, the system needs to be designed in such a way that a PUCCH resource used by the MTC coverage enhancement mode terminal does not collide with a PUCCH resource used by the normal mode terminal.

An aspect of the present disclosure is thus to provide a terminal, a base station, a transmission method, and a reception method that make it possible to avoid a PUCCH resource collision between the normal mode terminal and MTC coverage enhancement mode terminal without any decrease in the utilization efficiency of PDCCH resources or any increase in scheduling complexity.

Solution to Problem

A terminal according to an aspect of this disclosure includes: a receiving section that receives control information indicating assignment of downlink data, and the downlink data; a control section that determines a resource used for a response signal for the downlink data, based on the control information; and a transmitting section that transmits the response signal using the determined resource, in which: the transmitting section transmits the response signal using a resource in a first resource group when the terminal is a first terminal to which repetition transmission for the control information, the downlink data, and the response signal is applied; and the transmitting section transmits the response signal using a resource in a second resource group when the terminal is a second terminal to which the repetition transmission is not applied, the second resource group being different from the first resource group.

A base station according to an aspect of this disclosure includes: a transmitting section that transmits control information indicating assignment of downlink data, and the downlink data; a control section that determines a resource used for a response signal for the downlink data, based on the control information; and a receiving section that receives the response signal using the determined resource, in which: the receiving section receives, using a resource in a first resource group, the response signal transmitted from a first terminal to which repetition transmission for the control information, the downlink data, and the response signal is applied; and the receiving section receives, using a resource in a second resource group, the response signal transmitted from a second terminal to which the repetition transmission is not applied, the second resource group being different from the first resource group.

A transmitting method according to an aspect of this disclosure includes: receiving control information indicating assignment of downlink data, and the downlink data; determining a resource used for a response signal for the downlink data, based on the control information; and transmitting the response signal using the determined resource, in which: in the transmitting of the response signal, the response signal is transmitted using a resource in a first resource group from a first terminal to which repetition transmission for the control information, the downlink data, and the response signal is applied; and in the transmitting of the response signal, the response signal is transmitted using a resource in a second resource group from a second terminal to which the repetition transmission is not applied, the second resource group being different from the first resource group.

A receiving method according to an aspect of this disclosure includes: transmitting control information indicating assignment of downlink data, and the downlink data; determining a resource used for a response signal for the downlink data, based on the control information; and receiving the response signal using the determined resource, in which: in the receiving of the response signal, the response signal transmitted from a first terminal is received using a resource in a first resource group, the first terminal being a terminal to which repetition transmission for the control information, the downlink data, and the response signal is applied; and in the receiving of the response signal, the response signal transmitted from a second terminal is received using a resource in a second resource group that is different from the first resource group, the second terminal being a terminal to which the repetition transmission is not applied.

Advantageous Effects of Invention

According to an aspect of the present disclosure, it is possible to avoid a PUCCH resource collision between the normal mode terminal and MTC coverage enhancement mode terminal without any decrease in the utilization efficiency of PDCCH resources or any increase in scheduling complexity.

DESCRIPTION OF EMBODIMENTS

Figure 4:
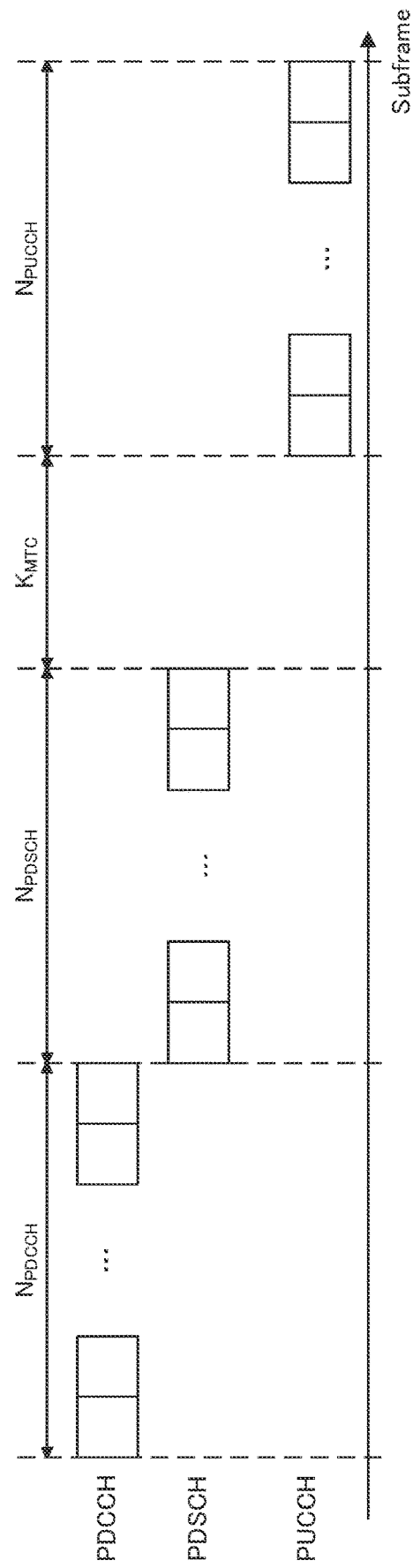
FIG. 4 is a diagram illustrating the transmission timing of each channel during repetition transmission.

FIG. 4 illustrates the transmission timing of each channel in MTC coverage enhancement that is assumed to be an aspect of this disclosure. In FIG. 4, "$N_{PDCCH}$," "$N_{PDSCH}$," and "$N_{PUCCH}$" represent the repetition level (the number of repetitions, or repetition factor) of PDCCH, the repetition level of PDSCH, and the repetition level of PUCCH, respectively. As illustrated in FIG. 4, the repetition transmission of PDCCH is performed first, and then, the repetition of PDSCH to which data is assigned by the PDCCH is performed in MTC coverage enhancement. The transmission timing of an ACK/NACK signal (PUCCH) from the terminal is after $K_{MTC}$ subframes which follow the subframe in which the reception of PDSCH has ended.

In a case where an MTC coverage enhancement mode terminal (terminal that performs repetition transmission) and a normal mode terminal (terminal that does not perform repetition transmission) coexist in a coverage area formed by the same base station, setting of different control channels for downlink control signals to the respective terminals causes a decrease in the spectral efficiency. In order to avoid such a decrease, it is possible to set a downlink control channel (PDCCH) using the same frequency for the normal mode and MTC coverage enhancement mode terminals.

With this setting, the time interval between a subframe in which an ACK/NACK signal is transmitted (first subframe in which repetition transmission of PUCCH is performed) and a subframe in which PDCCH including a CCE associated with the PUCCH resource used for transmission of an ACK/NACK signal is transmitted (last subframe in which repetition transmission of PDCCH is performed) varies between the normal mode and MTC coverage enhancement mode terminals. For this reason, when both of the terminals transmit an ACK/NACK signal in the same subframe, the CCE number associated with the PUCCH resource on which the normal mode terminal transmits the ACK/NACK signal and the CCE number associated with the PUCCH resource on which the MTC coverage enhancement terminal transmits the ACK/NACK signal may overlap each other. In this case, the ACK/NACK signals are transmitted using the same PUCCH resource by both of the terminals.

Figure 5:
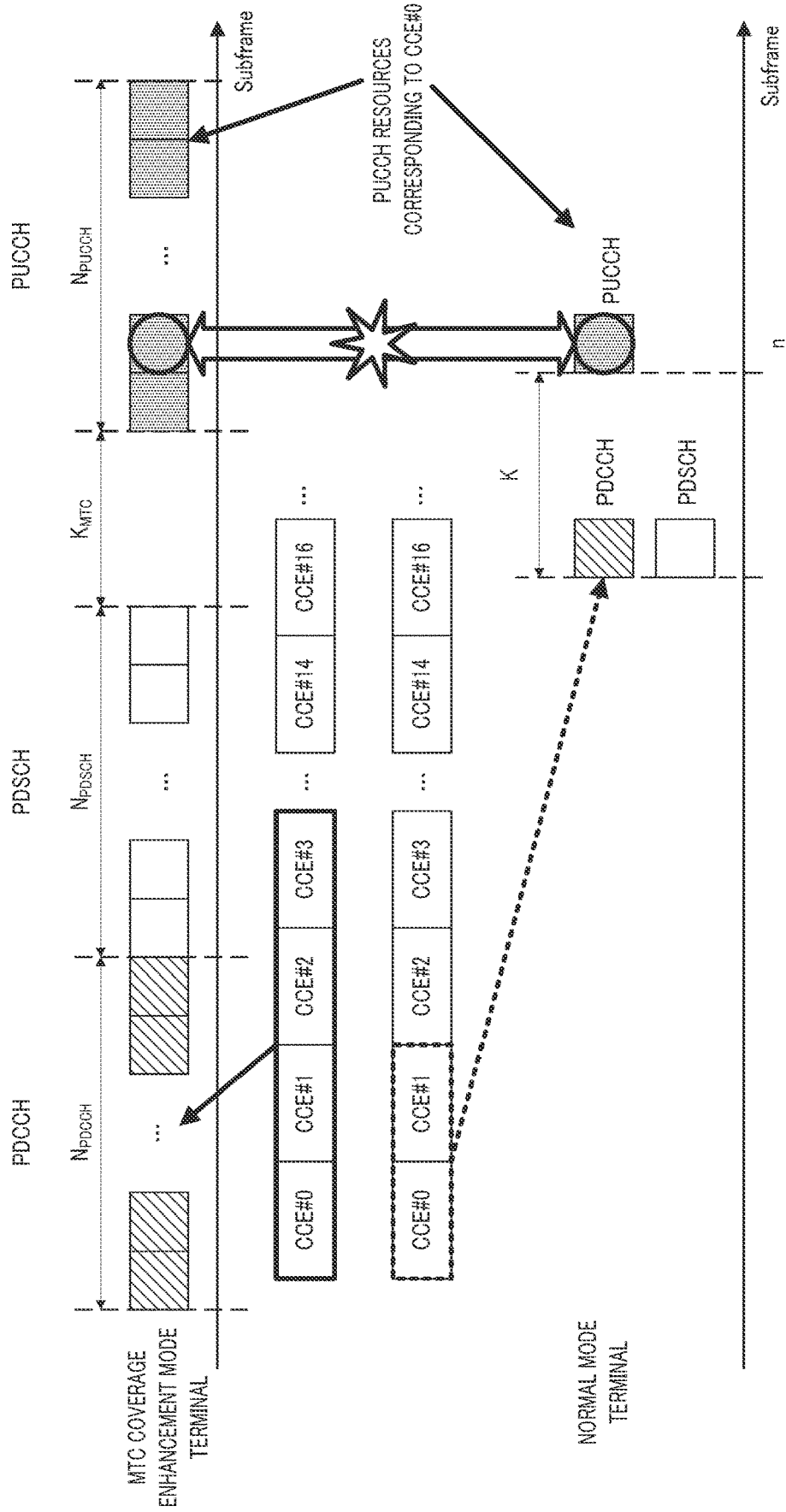
FIG. 5 is a block diagram illustrating an example of a PUCCH resource collision.

FIG. 5 illustrates an example of the case where the PUCCH resource used by the normal mode terminal and the PUCCH resource used by the MTC coverage enhancement mode terminal collide with each other. In FIG. 5, "n" represents the subframe where the PUCCH resource collision occurs.

In this case, PDCCH for the normal mode terminal is transmitted in subframe n–K, and the PDSCH assigned by the PDCCH is transmitted also in subframe n–K. Meanwhile, for the MTC coverage enhancement mode terminal, PDCCH is transmitted in subframe $n-K_{MTC}-N_{PDSCH}-N_{PDCCH}$ to $n-K_{MTC}-N_{PDSCH}-1$. The PDSCH assigned by the PDCCH is transmitted in subframe $n-K_{MTC}-N_{PDSCH}$ to $n-K_{MTC}-1$.

When the subframe in which PDCCH is transmitted to the normal mode terminal overlaps the subframe in which PDCCH is transmitted to the MTC coverage enhancement mode terminal, scheduling is performed so as to prevent transmission of PDCCH to both of the terminals using the same CCE. However, other than this case (e.g., in FIG. 5), the same CCE can be used for PDCCH transmission to the normal mode terminal and for repetition transmission of PDCCH to the MTC coverage enhancement mode terminal. For example, CCE #0 to CCE #3 are used for transmission of PDCCH to the MTC coverage enhancement mode terminal, and this MTC coverage enhancement mode terminal uses the PUCCH resource corresponding to CCE #0 (the smallest index of CCE #0 to CCE #3). In FIG. 5, CCE #0 and CCE #1 are used for transmission of PDCCH to the normal mode terminal, and this normal mode terminal uses a PUCCH resource corresponding to CCE #0 (the smallest index of CCE #0 and CCE #1).

As a result, a PUCCH resource collision in transmission of ACK/NACK signals occurs from the normal mode terminal and MTC coverage enhancement mode terminal.

In order to avoid a case where a PUCCH resource for transmitting an ACK/NACK signal from the normal mode terminal collides with a PUCCH resource for transmitting an ACK/NACK signal from the MTC coverage enhancement mode terminal, the base station may control PDCCH assignment for the normal mode terminal (i.e., not to allocate, to the normal mode terminal, a CCE that has been used for the MTC coverage enhancement mode terminal in the previous subframes). This case, however, involves a problem in that the utilization efficiency of PDCCH resources decreases or that scheduling complexity increases.

Hereinafter, a description will be given of each embodiment of the present disclosure in detail with reference to the accompanying drawings.

[Overview of Communication System]

In the following description, a Frequency Division Duplex (FDD) system will be used as an example.

In addition, a communication system according to each embodiment of this disclosure is an LTE-Advanced compliant system, for example, and includes base station 100 and terminal 200.

Terminal 200 is configured with a normal mode or an MTC coverage enhancement mode. When terminal 200 is configured with the MTC coverage enhancement mode, for example, repetition transmission for transmission of PDCCH, PDSCH, or PUCCH is applied to terminal 200 over a plurality of subframes. More specifically, terminal 200 repeatedly transmits the same signal over subframes that are contiguous for a predetermined repetition level.

Figure 6:
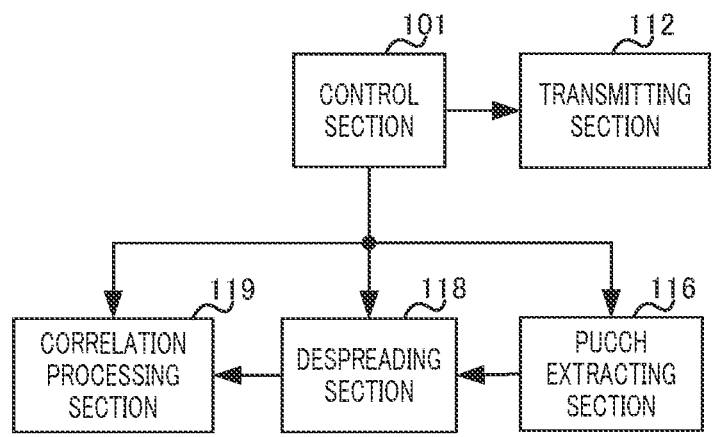
FIG. 6 is a block diagram illustrating a primary configuration of a base station according to Embodiment 1.

FIG. 6 is a block diagram illustrating a primary configuration of base station 100 according to Embodiment 1 of this disclosure. In base station 100 illustrated in FIG. 6, transmission section 112 transmits control information indicating downlink data assignment (PDCCH signal) and downlink data (PDSCH signal), and control section 101 determines a resource used for an ACK/NACK signal for the downlink data, based on the control information mentioned above, and an ACK/NACK signal receiving section (PUCCH extracting section 116, despreading section 118, and correlation processing section 119) receives an ACK/NACK signal using the determined resource. Note that, this receiving section receives, using a resource in a first resource group (PUCCH resource region), an ACK/NACK signal transmitted from a first terminal to which repetition transmission for the control information, downlink data and ACK/NACK signal is applied, and receives, using a resource in a second resource group (PUCCH resource region) that is different from the first resource group, an ACK/NACK signal transmitted from a second terminal to which the repetition transmission is not applied.

Figure 7:
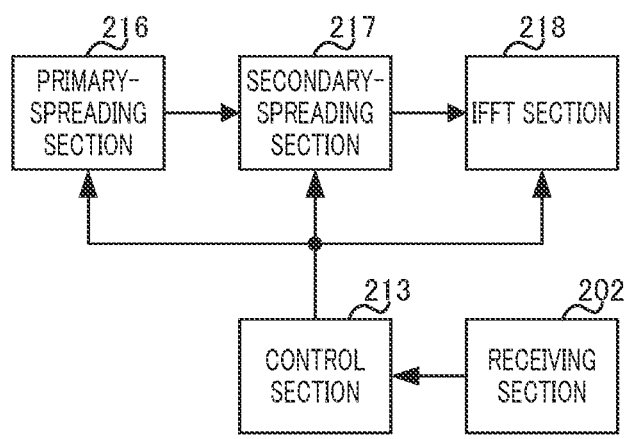
FIG. 7 is a block diagram illustrating a primary configuration of a terminal according to Embodiment 1.

FIG. 7 is a block diagram illustrating a primary configuration of terminal 200 according to each embodiment of this disclosure. In terminal 200 illustrated in FIG. 7, receiving section 202 receives control information indicating downlink data assignment, and downlink data. In addition, control section 213 determines a resource used for an ACK/NACK signal for the downlink data, based on the control information, and an ACK/NACK signal transmission section (primary-spreading section 216, secondary-spreading section 217, IFFT section 218) transmits the ACK/NACK signal using the determined resource. Note that, when the terminal including the ACK/NACK signal transmission section is a first terminal to which repetition transmission for the control information, downlink data and ACK/NACK signal is applied, the ACK/NACK signal transmission section transmits the ACK/NACK signal using a resource in a first resource group. When the terminal including the ACK/NACK signal transmission section is a second terminal to which the repetition transmission is not applied, the ACK/NACK signal transmission section transmits the ACK/NACK signal using a resource in a second resource group that is different from the first resource group.

Embodiment 1

[Configuration of Base Station]

Figure 8:
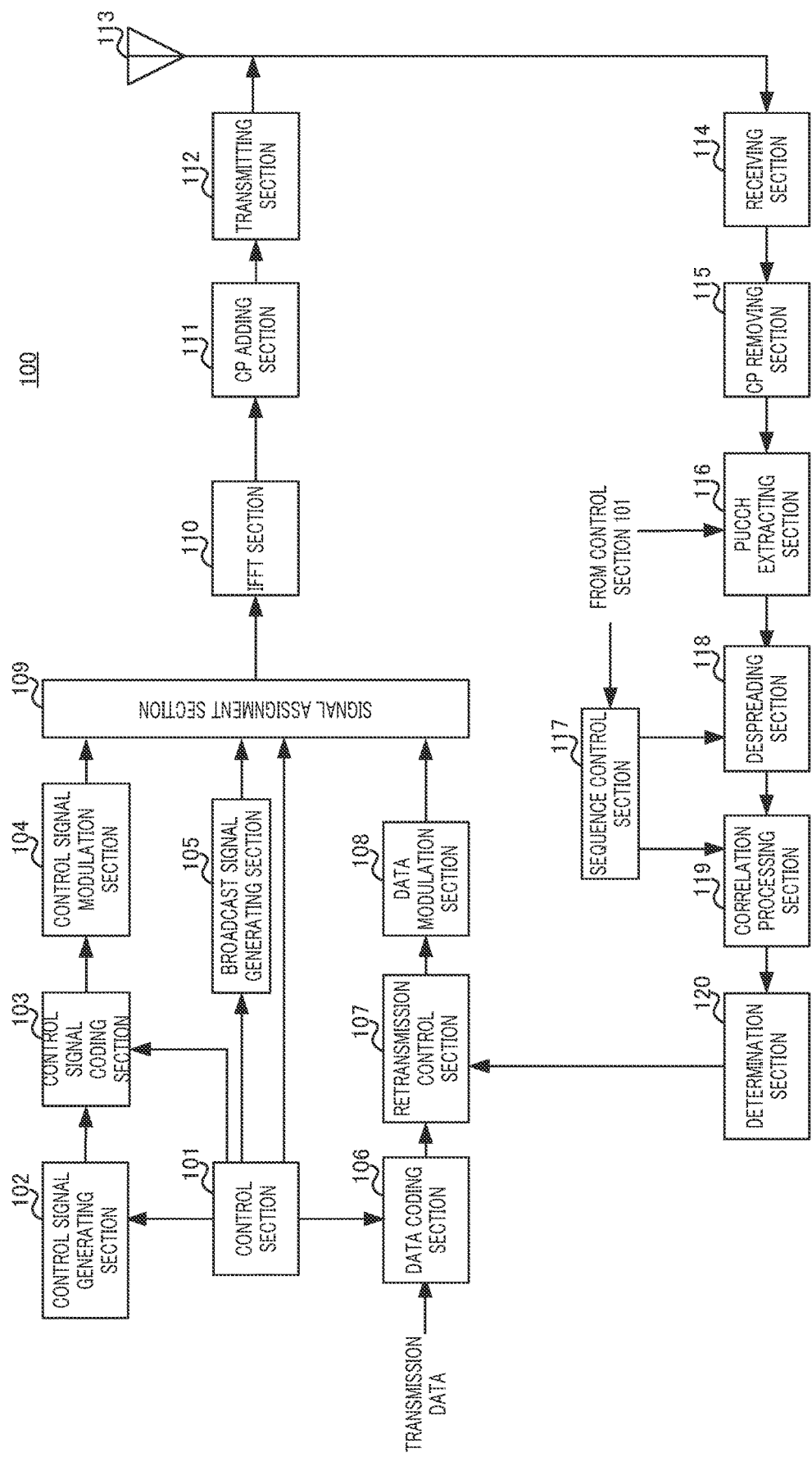
FIG. 8 is a block diagram illustrating a configuration of the base station according to Embodiment 1.

FIG. 8 is a block diagram illustrating a configuration of base station 100 according to Embodiment 1 of the present disclosure. In FIG. 8, base station 100 includes control section 101, control signal generating section 102, control signal coding section 103, control signal modulation section 104, broadcast signal generating section 105, data coding section 106, retransmission control section 107, data modulation section 108, signal assignment section 109, inverse fast Fourier transform (IFFT) section 110, CP adding section 111, transmission section 112, antenna 113, receiving section 114, CP removing section 115, PUCCH extracting section 116, sequence controlling section 117, despreading section 118, correlation processing section 119, and determination section 120.

Control section 101 allocates a downlink resource for transmitting control information (downlink control information assignment resource), and a downlink resource for transmitting downlink data (transmission data) (downlink data assignment resource) to resource allocation target terminal 200. The downlink control information assignment resource is selected within resources corresponding to PDCCH or Enhanced PDCCH (EPDCCH). In addition, the downlink data assignment resource is selected within resources corresponding to PDSCH. When a plurality of resource allocation target terminals 200 are present within the same subframe, control section 101 allocates a different resource to each resource allocation target terminal 200. The downlink control information assignment resource is equivalent to the L1/L2 CCH described above. Stated differently, the downlink control information assignment resource includes one or a plurality of CCEs. In addition, as described above, when PUCCH is implicitly indicated using a CCE, each CCE is associated with a PUCCH resource of an uplink control channel region (PUCCH region).

Control section 101 identifies a PUCCH resource corresponding to a CCE occupied by PDCCH including the control information (i.e., frequency, and code using in primary-spreading/secondary-spreading). Control section 101 outputs, to sequence control section 117, information on a ZAC sequence and orthogonal code sequence that may be used for spreading a PUCCH signal transmitted from terminal 200 (ACK/NACK signals and reference signals) (i.e., information on PUCCH resource), and outputs information on the frequency to PUCCH extracting section 116.

Moreover, control section 101 determines a coding rate used for transmitting control information to resource allocation target terminal 200 and outputs the determined coding rate to control signal coding section 103. Control section 101 also determines a coding rate used for transmitting downlink data to resource allocation target terminal 200 and outputs the determined coding rate to data coding section 106.

Note that, the data volume of control information varies depending on the determined coding rate, so that control section 101 allocates downlink control information assignment resource including CCEs sufficient for mapping the control information of this data volume. Control section 101 outputs information on a downlink data assignment resource to control signal generating section 102. Control section 101 outputs information on the downlink data assignment resource and downlink control information assignment resource to signal assignment section 109.

Moreover, when resource allocation target terminal 200 is configured with the MTC coverage enhancement mode, control section 101 outputs information on the repetition level (the number of repetitions) for each channel (PDCCH, PDSCH, or PUCCH) of resource allocation target terminal 200 to control signal generating section 102 and data coding section 106.

Moreover, control section 101 instructs broadcast signal generating section 105 to generate a broadcast signal based on a parameter determined for each base station in advance.

Control section 101 also generates information on PUCCH resources and outputs the information to control signal generating section 102. The information on PUCCH resources includes a parameter for identifying the PUCCH resources used in the normal mode terminal and MTC coverage enhancement mode terminal. Note that, the information on PUCCH resources may be indicated to terminals 200 as broadcast information indicating a cell-specific value, and may be indicated to terminals 200 by higher layer signaling.

Control signal generating section 102 generates a control signal using the information received from control section 101 (i.e., information on downlink data assignment resource, information on repetition level of PUCCH, or information PUCCH resources) and outputs the control signal to control signal coding section 103. When a plurality of resource allocation target terminals 200 are present, the control signal includes a terminal ID of each destination terminal for the purpose of identifying each resource allocation target terminal 200. For example, the control signal includes CRC bits masked by the terminal IDs of destination terminals. When resource allocation target terminal 200 is configured with the MTC coverage enhancement mode, control signal generating section 102 generates a repetition signal in accordance with the information on the repetition level received from control section 101. More specifically, when the repetition level of PDCCH is greater than 1, control signal generating section 102 outputs the same control signal over a plurality of contiguous subframes corresponding to the repetition level to control signal coding section 103.

Control signal coding section 103 encodes the control signal received from control signal generating section 102, in accordance with the coding rate received from control section 101, and outputs the coded control signal to control signal modulation section 104.

Control signal modulation section 104 modulates the control signal received from control signal coding section 103 and outputs the modulated control signal to signal assignment section 109.

Broadcast signal generating section 105 generates a broadcast signal in accordance with an instruction from control section 101 and outputs the broadcast signal to signal assignment section 109. Note that, the broadcast signal includes a signal for system bandwidth, or PUCCH resources, for example. The broadcast signal may be subjected to coding processing and modulation processing.

Data coding section 106 encodes transmission data for each destination terminal (bit sequence, i.e., downlink data) in accordance with the coding rate received from control section 101 and outputs the coded data signal to retransmission control section 107. Moreover, when resource allocation target terminal 200 is configured with the MTC coverage enhancement mode, data coding section 106 generates a repetition signal in accordance with the information on the repetition level received from control section 101. More specifically, when the repetition level of PDSCH is greater than 1, data coding section 106 outputs the same data signal to retransmission control section 107 over a plurality of contiguous subframes corresponding to the repetition level.

Retransmission control section 107 holds the coded data signal received from data coding section 106 and also outputs the coded data signal to data modulation section 108 for the initial transmission. Retransmission control section 107 holds the coded data signal for each destination terminal. In addition, upon reception of a NACK for the transmitted data signal from determination section 120 to be described hereinafter, retransmission control section 107 outputs the corresponding held data to data modulation section 108. Upon reception of an ACK for the transmitted data signal, retransmission control section 107 deletes the corresponding held data.

Data modulation section 108 modulates a data signal received from retransmission control section 107 and outputs the data modulation signal to signal assignment section 109.

Signal assignment section 109 maps the control signal received from control signal modulation section 104, the broadcast signal received from broadcast signal generating section 105, and the data modulation signal received from data modulation section 108 to downlink resources (such as downlink data signal assignment resources or downlink control information assignment resources) and outputs the mapped signals to IFFT section 110. More specifically, signal assignment section 109 maps the control signal to a resource indicated by the downlink control information assignment resource received from control section 101 and also maps the data modulation signal to a resource indicated by the downlink data assignment resource received from control section 101. Moreover, signal assignment section 109 maps the broadcast signal to a previously set time and frequency resource.

IFFT section 110 transforms a frequency domain signal into a time domain signal by performing IFFT processing on the signal received from signal assignment section 109. IFFT section 110 outputs the time domain signal to CP adding section 111.

CP adding section 111 adds a CP to the signal received from IFFT section 110 and outputs the CP added signal (OFDM signal) to transmission section 112.

Transmission section 112 performs radio frequency (RF) processing such as digital to analog (D/A) conversion or up-conversion on the OFDM signal received from CP adding section 111 and outputs a radio signal to terminal 200 via antenna 113.

Receiving section 114 performs RF processing such as down-conversion or analog-to-digital (A/D) conversion on the radio signal received from terminal 200 via antenna 113 and outputs a received signal thus obtained to CP removal section 115.

CP removal section 115 removes a CP added to the received signal to be received from receiving section 114 and outputs the CP removed signal to PUCCH extracting section 116.

PUCCH extracting section 116 extracts an uplink control channel signal (PUCCH) received from CP removal section 115 based on the information received from control section 101 and outputs the extracted PUCCH to despreading section 118. When an MTC coverage enhancement mode terminal 200 is present, PUCCH extracting section 116 performs coherent combining on the PUCCH repeatedly transmitted over a plurality of subframes to extract the PUCCH (combined signal).

Sequence control section 117 generates a ZAC sequence and orthogonal code sequence that may be used for spreading ACK/NACK signals and reference signals transmitted from terminal 200, based on the information on the ZAC sequence and orthogonal code sequence received from control section 101. Sequence control section 117 outputs the orthogonal code sequence to despreading section 118 and also outputs the ZAC sequence to correlation processing section 119.

Despreading section 118 despreads a portion of the signal received from PUCCH extracting section 116 that is a signal portion corresponding to the ACK/NACK signal, using the orthogonal code sequence received from sequence control section 117 (i.e., orthogonal code sequence used in secondary-spreading by terminal 200), and outputs the despread signal to correlation processing section 119.

Correlation processing section 119 obtains a correlation value between the ZAC sequence received as input from sequence control section 117 (i.e., ZAC sequence that may be used in primary-spreading by terminal 200) and the signal received as input from despreading section 118, and outputs the obtained correlation value to determination section 120.

Determination section 120 determines whether the ACK/NACK signal transmitted from terminal 200 indicates an ACK or NACK for the transmitted data, based on the correlation value received from correlation processing section 119. Determination section 120 outputs the result of determination to retransmission control section 107.

[Configuration of Terminal]

Figure 9:
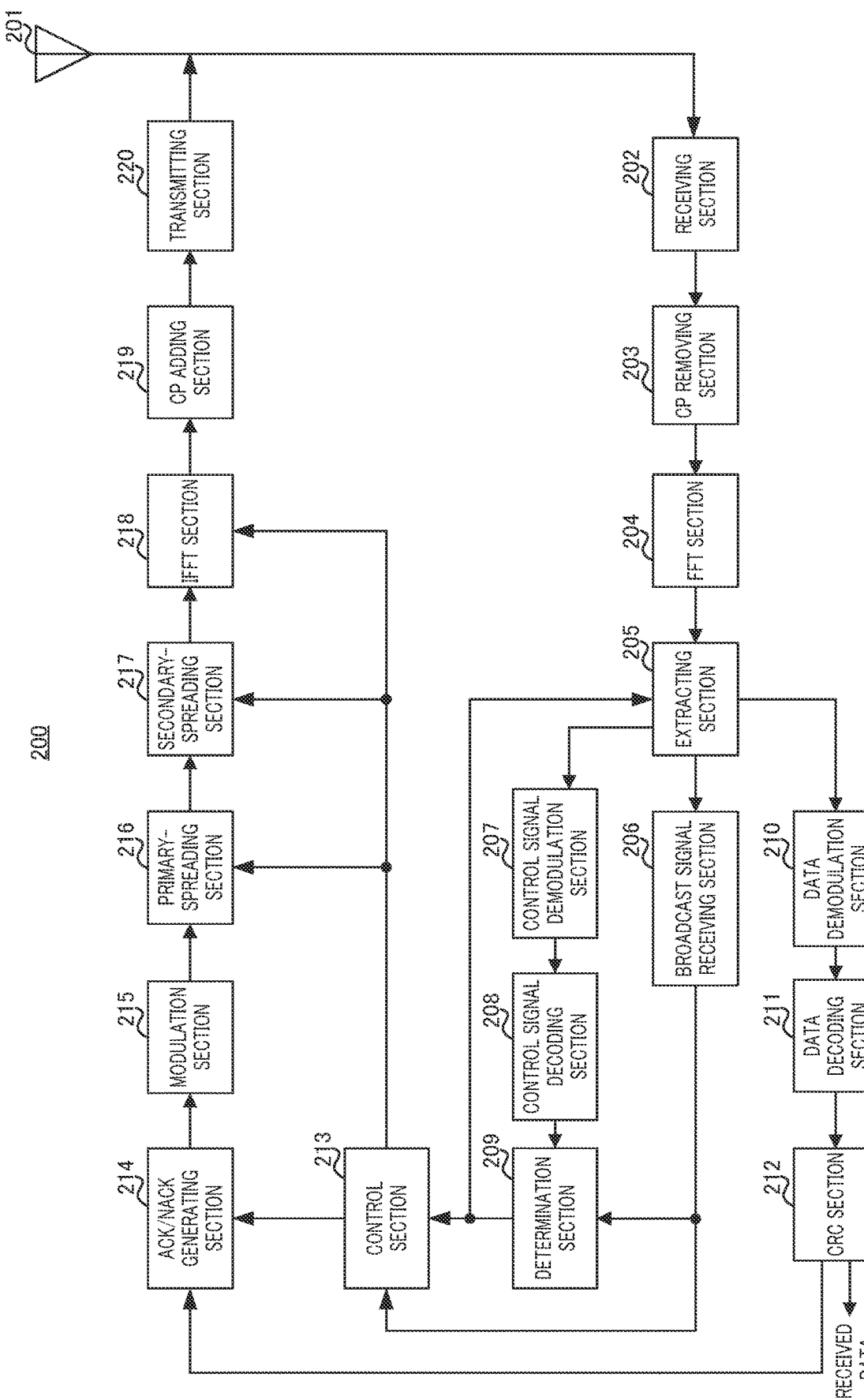
FIG. 9 is a block diagram illustrating a configuration of the terminal according to Embodiment 1.

FIG. 9 is a block diagram illustrating a configuration of terminal 200 according to Embodiment 1 of the present disclosure. In FIG. 9, terminal 200 includes antenna 201, receiving section 202, CP removing section 203, fast Fourier transform (FFT) section 204, extraction section 205, broadcast signal receiving section 206, control signal demodulation section 207, control signal decoding section 208, determination section 209, data demodulation section 210, data decoding section 211, CRC section 212, control section 213, ACK/NACK generating section 214, modulation section 215, primary-spreading section 216, secondary-spreading section 217, IFFT section 218, CP adding section 219, and transmitting section 220.

Receiving section 202 performs RF processing such as down-conversion or A/D conversion on the radio signal received from base station 100 via antenna 201 to obtain a baseband OFDM signal. Receiving section 202 outputs the OFDM signal to CP removing section 203.

CP removing section 203 removes the CP added to the OFDM signal received from receiving section 202 and outputs the signal after the CP removal to FFT section 204.

FFT section 204 performs FFT processing on the signal received from CP removing section 203 to transform a time domain signal into a frequency domain signal. FFT section 204 outputs the frequency domain signal to extraction section 205.

Extraction section 205 extracts a broadcast signal from the signal received from FFT section 204 and outputs the broadcast signal to broadcast signal receiving section 206. Note that, a resource to which the broadcast signal is mapped is determined in advance, so that extraction section 205 obtains the broadcast signal by extracting information mapped to the resource. The extracted broadcast signal includes a signal related to a system bandwidth or a PUCCH resource, for example.

In addition, extraction section 205 extracts a downlink control channel signal (PDCCH signal) from the signal received from FFT section 204 and outputs the downlink control channel signal to control signal demodulation section 207. Furthermore, extraction section 205 extracts downlink data (PDSCH signal) from the signal received from FFT section 204, based on the information on the downlink data assignment resource intended for terminal 200 of extraction section 205 received from determination section 209, and outputs the downlink data to data demodulation section 210. The PDCCH signal includes the information on the downlink data assignment resource, the information on the repetition level of PUCCH, or the information on PUCCH resources, for example.

Moreover, when terminal 200 is configured with the MTC coverage enhancement mode, and the PDCCH signal is repeatedly transmitted, extraction section 205 performs coherent combining on the PDCCH repeatedly transmitted over a plurality of subframes to extract the PDCCH. Likewise, when downlink data (PDSCH signal) is repeatedly transmitted, extraction section 205 performs coherent combining on the PDSCH repeatedly transmitted over a plurality of subframes to extract the downlink data.

Broadcast signal receiving section 206 obtains information on the system bandwidth or PUCCH resources from the broadcast signal received from extraction section 205. When the broadcast signal has been subjected to coding processing and modulation processing, broadcast signal receiving section 206 performs demodulation processing and decoding processing on the broadcast signal. Broadcast signal receiving section 206 outputs the obtained broadcast signal to determination section 209 or control section 213.

Control signal demodulation section 207 demodulates the PDCCH signal received from extraction section 205 and outputs the demodulated PDCCH signal to control signal decoding section 208.

Control signal decoding section 208 decodes the PDCCH signal received from control signal demodulation section 207 and outputs the decoding result to determination section 209.

Determination section 209 performs blind-determination to find out whether or not the control information included in the decoding result received from control signal decoding section 208 is the control information intended for terminal 200. For example, determination section 209 perform de-masking on the CRC bits by the terminal ID of terminal 200 and determines that the control information resulting in CRC=OK (no error) as the control information intended for terminal 200. Determination section 209 outputs information on the downlink data assignment resource included in the control information intended for terminal 200 to extraction section 205. Moreover, determination section 209 identifies a CCE to which the control information intended for terminal 200 is mapped, and outputs the identification information of the identified CCE to control section 213.

Data demodulation section 210 demodulates the downlink data received from extraction section 205 and outputs the demodulated downlink data to data decoding section 211.

Data decoding section 211 decodes the downlink data received from data demodulation section 210 and outputs the decoded downlink data to CRC section 212.

CRC section 212 performs CRC error detection on the downlink data received from data decoding section 211 and outputs the error detection result to ACK/NACK generating section 214. In addition, CRC section 212 transmits, as the received data, the downlink data that has been determined as having no error as a result of error detection.

Control section 213 holds in advance the information on a PUCCH resource indicated to terminal 200 via a broadcast signal, PDCCH signal or higher layer signaling, and the information on the repetition level.

Control section 213 uses the information on a PUCCH resource and CCE identification information received from determination section 209 and thereby identifies a PUCCH resource corresponding to the CCE indicated by the CCE identification information (i.e., frequency, and code used in primary-spreading/secondary-spreading). Stated differently, control section 213 identifies a PUCCH resource on the uplink control channel based on the CCE identification information.

More specifically, control section 213 generates a ZAC sequence corresponding to a PUCCH resource to be used and also determines a cyclic shift value to be used, based on the configured cyclic shift value and outputs the ZAC sequence and cyclic shift value to primary-spreading section 216. In addition, control section 213 outputs an orthogonal code sequence corresponding to the PUCCH resource to be used to secondary-spreading section 217. Control section 213 outputs the frequency resource (subcarriers) corresponding to the PUCCH resource to be used to IFFT section 218.

Moreover, when terminal 200 is configured with the MTC coverage enhancement mode, control section 213 outputs the information on the repetition level of PUCCH to ACK/NACK generating section 214.

ACK/NACK generating section 214 generates an ACK/NACK signal based on the error detection result received from CRC section 212. More specifically, ACK/NACK generating section 214 generates a NACK signal when an error is detected, and generates an ACK signal when no error is detected. ACK/NACK generating section 214 outputs the generated ACK/NACK signal to modulation section 215. When the terminal including ACK/NACK generating section 214 is configured with the MTC coverage enhancement mode, ACK/NACK generating section 214 transmits a repetition signal in accordance with the information on the repetition level received from control section 213. More specifically, ACK/NACK generating section 214 outputs the same ACK/NACK signal to modulation section 215 over a plurality of contiguous subframes corresponding to the repetition level.

Modulation section 215 modulates an ACK/NACK signal received from ACK/NACK generating section 214 and outputs the modulated ACK/NACK signal to primary-spreading section 216.

Primary-spreading section 216 performs primary-spreading of the reference signal, and ACK/NACK signal received from modulation section 215, using the ZAC sequence and cyclic shift value configured by control section 213, and outputs the ACK/NACK signal and reference signal after the primary-spreading to secondary-spreading section 217.

Secondary-spreading section 217 performs secondary-spreading of the ACK/NACK signal and reference signal using the orthogonal code sequence configured by control section 213 and outputs the signal after the secondary-spreading to IFFT section 218.

IFFT section 218 generates a time domain signal by mapping the ACK/NACK signal and reference signal received from secondary-spreading section 217 to the subcarriers and performing IFFT processing, using the frequency resource configured by control section 213. IFFT section 218 outputs the generated signal to CP adding section 219.

CP adding section 219 adds a CP to the signal received from IFFT section 218 and transmits the CP added signal to transmission section 220.

Transmission section 220 performs RF processing such as D/A conversion or up-conversion on the signal received from CP adding section 219 and transmits the radio signal to base station 100 via antenna 201.

[Operation of Base Station 100 and Terminal 200]

Hereinafter, a description will be given of operation of base station 100 and terminal 200 configured in the manner described above.

Hereinafter, a case where a normal mode terminal and an MTC coverage enhancement mode terminal coexist in a cell formed by base station 100 will be described.

Base station 100 according to Embodiment 1 indicates information on a PUCCH resource to each terminal 200 in advance. The information on a PUCCH resource is information on an offset value used for identifying a PUCCH resource number from a CCE number and a maximum number of PUCCH resources to be code-multiplexed per resource block (RB) placed in each PUCCH region.

In Embodiment 1, the offset value mentioned above is independently configured for the normal mode terminal and the MTC coverage enhancement mode terminal.

More specifically, upon reception of downlink assignment control information (PDCCH or EPDCCH), the normal mode terminal determines resource number $n_{PUCCH}$ of a PUCCH resource for transmitting an ACK/NACK signal for downlink data (PDSCH) indicated by the corresponding assignment control information, using the following equation.

$$n_{PUCCH}=n_{CCE}+N_{PUCCH}^{(1)} \quad \text{(Equation 1)}$$

In Equation 1, "$n_{CCE}$" represents the CCE number of a CCE occupied by PDCCH (integer equal to or greater than 0). More specifically, when PDCCH occupies only one CCE, "$n_{CCE}$" represents the CCE number of the CCE. Meanwhile, when PDCCH occupies a plurality of CCEs, "$n_{CCE}$" represents the smallest CCE number.

In Equation 1, "$N_{PUCCH}^{(1)}$" represents the offset value for identifying a PUCCH resource number from a CCE number. For example, in 3GPP Release 11, $N_{PUCCH}^{(1)}$ represents the number of PUCCH resources reserved for Semi-Persistent Scheduling/Scheduling Request (SPS/SR) resources. "$N_{PUCCH}^{(1)}$" is a common value in the cell, for example, and is indicated to terminal 200 from base station 100 by a broadcast signal or higher layer signaling.

The normal mode terminal determines an OC index and cyclic shift value to be actually used, based on the determined PUCCH resource number "$n_{PUCCH}$."

Meanwhile, upon reception of downlink assignment control information (PDCCH or EPDCCH), the MTC coverage enhancement mode terminal determines resource number "$n_{PUCCH\_MTC}$" of a PUCCH resource for transmitting an ACK/NACK signal for downlink data (PDSCH) indicated by the corresponding assignment control information, using the following equation.

$$n_{PUCCH\_MTC} = n_{CCE} + N_{PUCCH\_MTC}^{(1)} \quad \text{(Equation 2)}$$

In Equation 2, "$N_{PUCCH\_MTC}^{(1)}$" represents an offset value for identifying a PUCCH resource number from a CCE number for the MTC coverage enhancement mode terminal. More specifically, an independent offset value, $N_{PUCCH\_MTC}^{(1)}$, which is different from offset value $N_{PUCCH}^{(1)}$ for the normal mode terminal, is configured for the MTC coverage enhancement mode terminal. For example, $N_{PUCCH\_MTC}^{(1)}$ may be an individual (UE-specific) value dependent on terminal 200, or may be value common to the MTC coverage enhancement mode terminals.

The MTC coverage enhancement mode terminal determines an OC index and cyclic shift value to be actually used, based on the determined PUCCH resource number $n_{PUCCH\_MTC}$.

Figure 10:
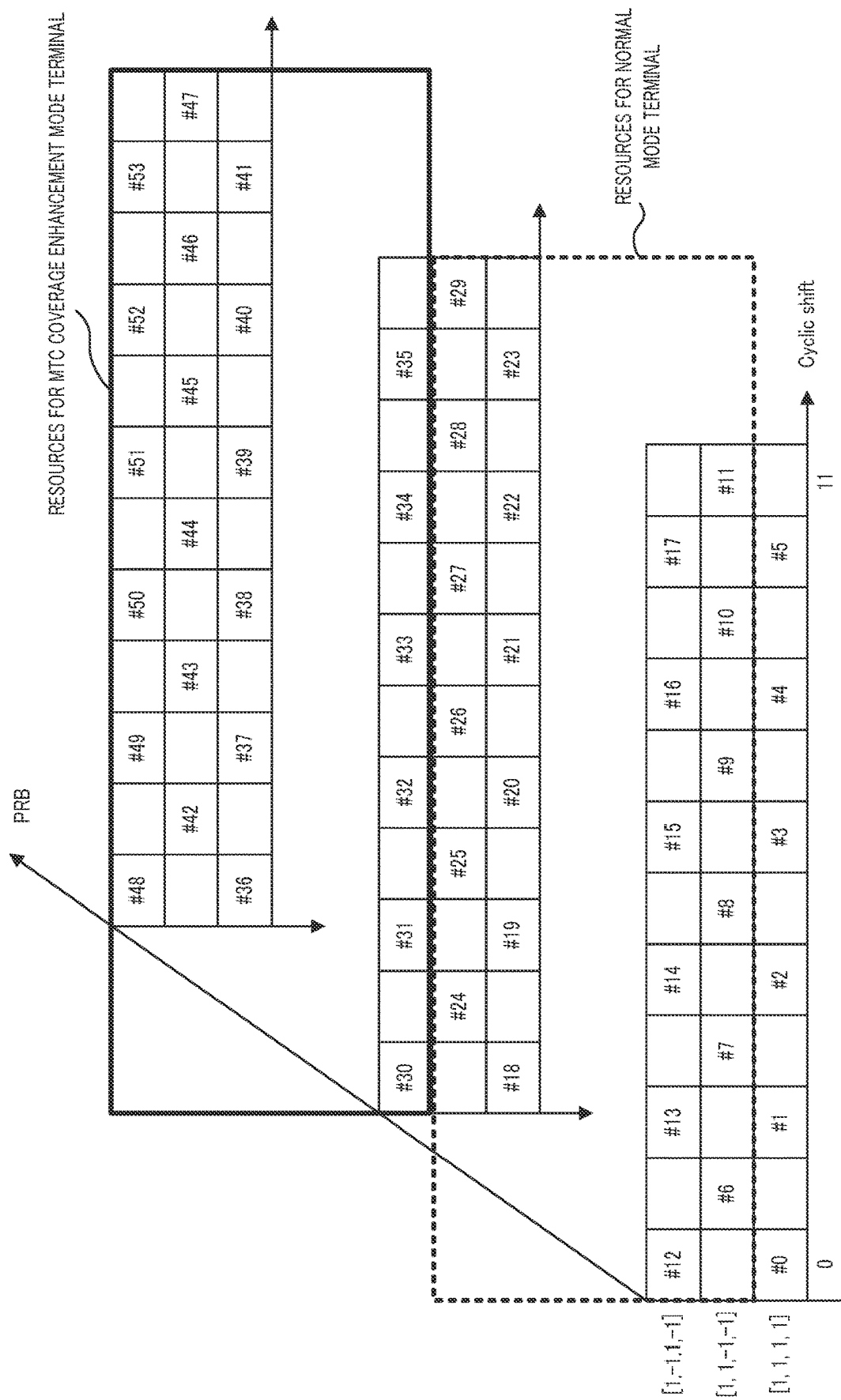
FIG. 10 is a diagram illustrating PUCCH resources according to Embodiment 1.

FIG. 10 illustrates an example of PUCCH resources for the normal mode terminal and MTC coverage enhancement mode terminal.

Figure 1:
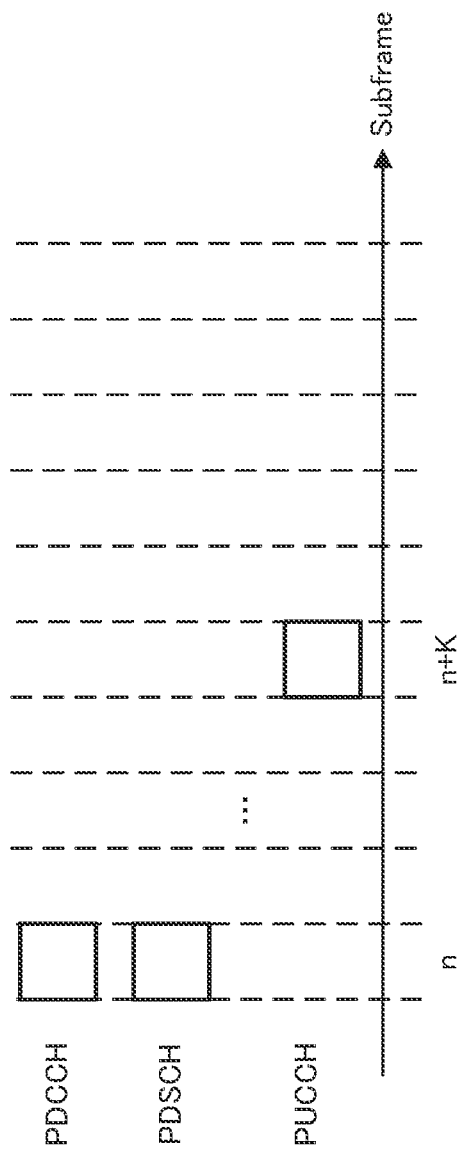
FIG. 1 is a diagram illustrating the transmission timing of each channel.
Figure 2:
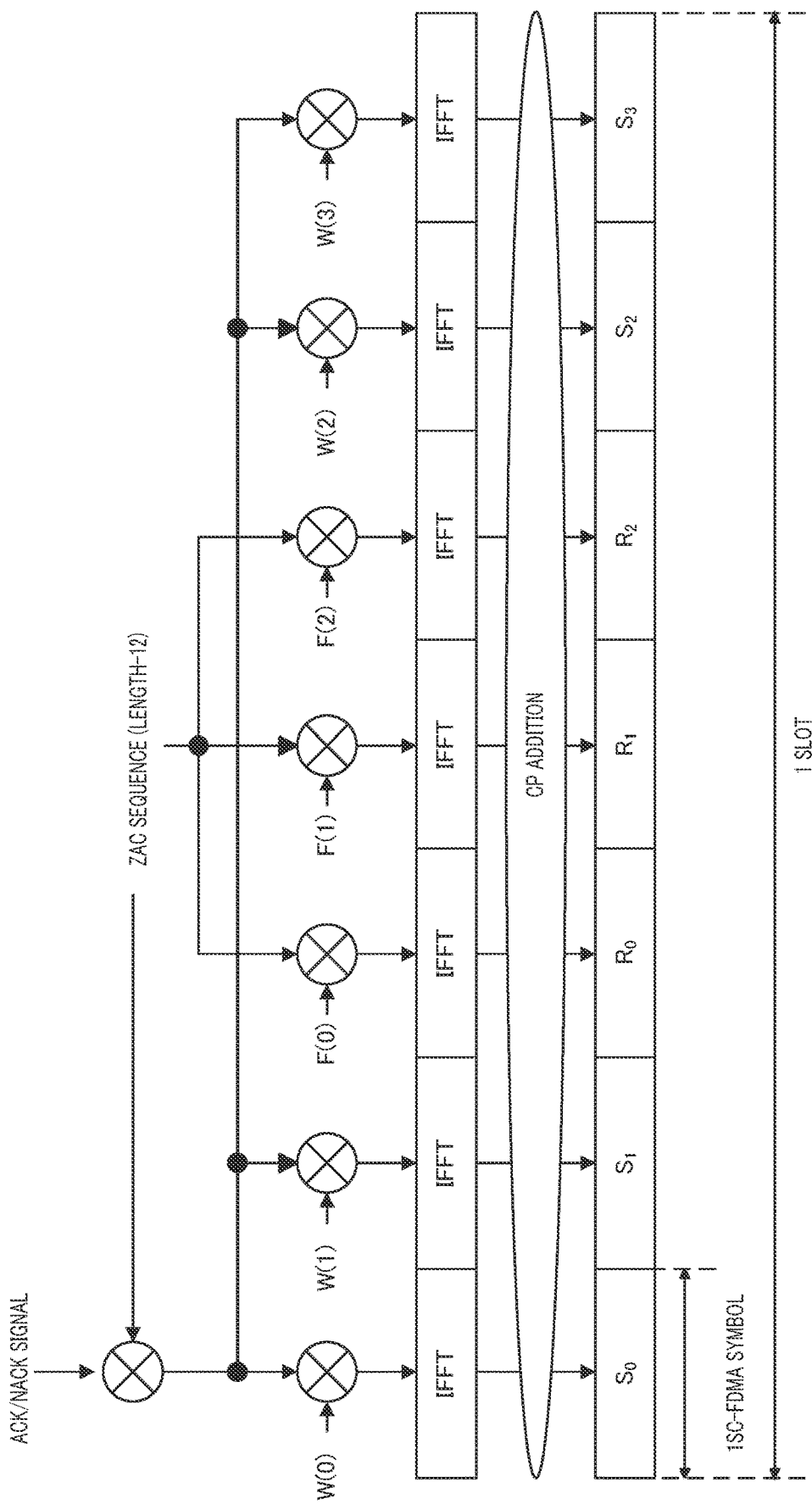
FIG. 2 is a diagram illustrating a method of spreading response signals and reference signals.
Figure 3:
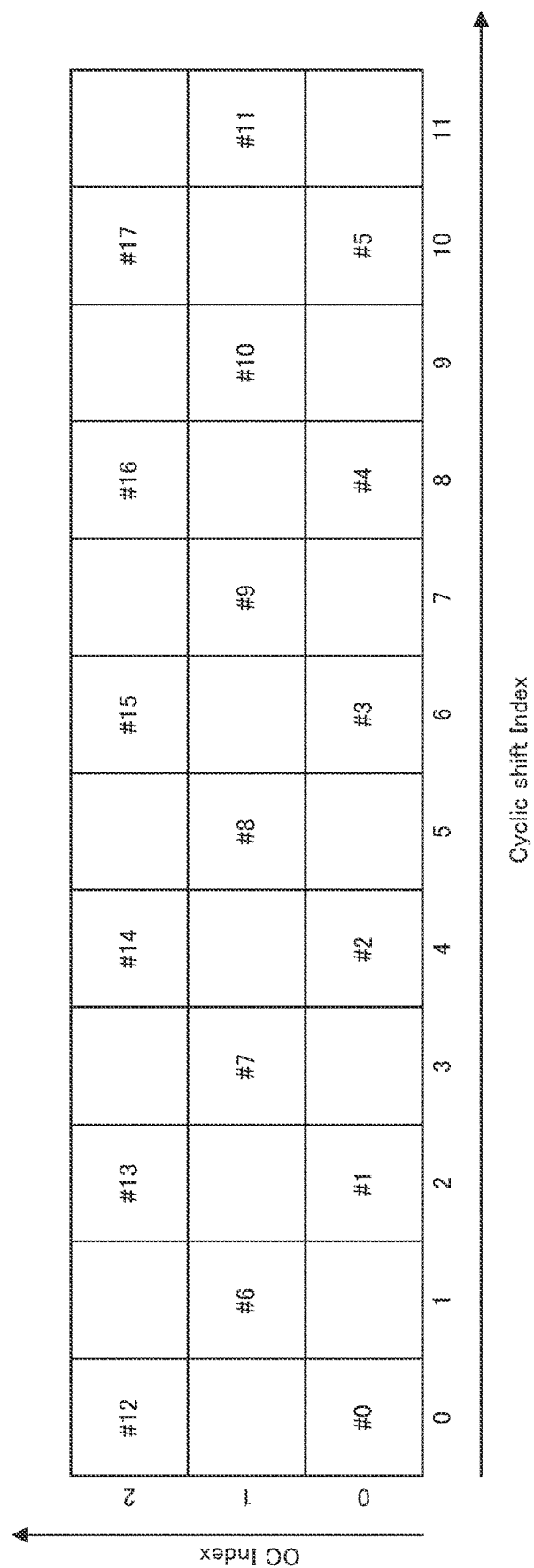
FIG. 3 is a diagram illustrating an example of PUCCH resources.

In FIG. 10, 18 PUCCH resources are available among a maximum of 36 PUCCH resources for each RB (Physical RB (PRB)) as in the case of FIG. 3. In FIG. 10, 54 available PUCCH resources are assigned PUCCH resource numbers (#0 to #53), respectively, over three RBs.

In FIG. 10, offset value "$N_{PUCCH}^{(1)}$" for the normal mode terminal is equal to 6, and offset value "$N_{PUCCH\_MTC}^{(1)}$" for the MTC coverage enhancement mode terminal is equal to 30.

More specifically, the normal mode terminal transmits an ACK/NACK signal using a PUCCH resource of PUCCH resource number "$n_{PUCCH} = n_{CCE} + 6$." Meanwhile, the MTC coverage enhancement mode terminal transmits an ACK/NACK signal using a PUCCH resource of PUCCH resource number "$n_{PUCCH\_MTC} = n_{CCE} + 30$."

Stated differently, when configured with the normal mode, terminal 200 transmits an ACK/NACK signal using a PUCCH resource in a PUCCH resource group for the normal mode terminals, and when configured with the MTC coverage enhancement mode, terminal 200 transmits an ACK/NACK signal using a PUCCH resource in a PUCCH resource group for the MTC coverage enhancement terminals, which is different from the PUCCH resource group for the normal mode terminals.

Likewise, base station 100 receives an ACK/NACK signal transmitted from the normal mode terminal, using a resource in the PUCCH resource group for the normal mode terminals, and receives an ACK/NACK signal transmitted from the MTC coverage enhancement mode terminal, using a resource in the PUCCH resource group for the MTC coverage enhancement mode terminals, which is different from the PUCCH resource group for the normal mode terminals.

In this way, as illustrated in FIG. 10, the PUCCH resource group available for transmission of an ACK/NACK signal from the MTC coverage enhancement mode terminal to which repetition transmission for a PDCCH signal, PDSCH signal, and ACK/NACK signal is applied is different from the PUCCH resource group available for transmission of an ACK/NACK signal from the normal mode terminal to which the repetition transmission is not applied. Stated differently, the PUCCH resource region is divided into a region for the normal mode terminals and a region for the MTC coverage enhancement mode terminals by setting mutually different offset values for the normal mode and MTC coverage enhancement mode terminals, each of the offset values being used for identifying a PUCCH resource number from a CCE number.

Note that, FIG. 10 illustrates a case where the number of CCEs available for terminals 200 of each mode is 24. The number of CCEs available for terminals 200 of each mode is, however, not limited to 24, and may take another value. More specifically, offset values "$N_{PUCCH}^{(1)}$" and "$N_{PUCCH\_MTC}^{(1)}$" may be set in such a way that the PUCCH resource region is divided into regions for terminals 200 of the respective modes, depending on the number of available CCEs.

Hereinafter, a description will be given of a case where the CCE number corresponding to the PUCCH resource used for an ACK/NACK signal transmitted in the same subframe is CCE #0 (i.e., $n_{CCE}=0$) as illustrated in FIG. 5, for example.

In this case, the normal mode terminal uses a PUCCH resource corresponding to PUCCH resource number "$n_{PUCCH}=6(=0+6)$" in accordance with Equation 1.

Meanwhile, the MTC coverage enhancement mode terminal uses a PUCCH resource corresponding to PUCCH resource number "$n_{PUCCH\_MTC}=30(=0+30)$" in accordance with Equation 2.

More specifically, when configured with the normal mode, terminal 200 (control section 213) adds offset value "$N_{PUCCH}^{(1)}$" to index "$n_{CCE}$" of a CCE used for PDCCH to calculate the PUCCH resource to be actually used for an ACK/NACK signal. In addition, when configured with the MTC coverage enhancement mode, terminal 200 adds offset value "$N_{PUCCH\_MTC}^{(1)}$" to index "$n_{CCE}$" of a CCE used for PDCCH to calculate the PUCCH resource to be actually used for an ACK/NACK signal. However, offset value "$N_{PUCCH}^{(1)}$" and offset value "$N_{PUCCH\_MTC}^{(1)}$" are different.

Thus, in a case where the terminals of the two modes each transmit an ACK/NACK signal in the same subframe, even if the CCE number associated with a PUCCH resource for transmitting an ACK/NACK signal from the normal mode terminal and the CCE number associated with a PUCCH resource for transmitting an ACK/NACK signal from the MTC coverage enhancement mode terminal are both CCE #0, the PUCCH resources used by the respective terminals are different.

Stated differently, in a case where the terminals of the two modes each transmit an ACK/NACK signal in the same subframe, even if the CCE numbers (smallest index) used for the corresponding PDCCH are the same, a PUCCH resource collision between the normal mode terminal and MTC coverage enhancement mode terminal can be avoided.

As described above, according to Embodiment 1, PUCCH resources are determined for the normal mode and MTC coverage enhancement mode terminals using different offset values, respectively. As a result, the PUCCH resources available for the normal mode terminals are isolated from the PUCCH resources available for the MTC coverage enhancement mode terminals. Thus, even when the CCEs occupied by PDCCH used for the assignment of downlink data corresponding to the ACK/NACK signals to be transmitted in the same subframe are the same, the PUCCH resources used for the ACK/NACK signals can be different. Thus, a PUCCH resource collision in transmission of the ACK/NACK signals can be avoided.

Moreover, as described above, a PUCCH resource collision is avoided by setting different offset values to the normal mode and MTC coverage enhancement mode terminals, each of the offset values being used for identifying a PUCCH resource number. Accordingly, it is not necessary to add any restriction on PDCCH resource allocation. For this reason, Embodiment 1 does not involve any decrease in the utilization efficiency of PUCCH resources or any increase in scheduling complexity.

According to Embodiment 1, a PUCCH resource collision between the normal mode terminal and MTC coverage enhancement mode terminal can be avoided without any decrease in the utilization efficiency of PDCCH resources or any increase in scheduling complexity.

Moreover, the PUCCH resource allocation for the normal mode terminals (e.g., see Equation 1) has been already in practice in LTE systems. For this reason, in Embodiment 1, base station 100 additionally indicates, to terminal 200, only offset value "$N_{PUCCH\_MTC}^{(1)}$" used independently during the PUCCH resource allocation for the MTC coverage enhancement mode terminals. Thus, there is no major influence on the operation of the current systems.

Embodiment 2

The basic configurations of a base station and a terminal according to Embodiment 2 are similar to those in Embodiment 1, so that a description will be given below with reference to FIG. 8 (base station 100) and FIG. 9 (terminal 200).

Hereinafter, as in Embodiment 1, a description will be given of a case where a normal mode terminal and an MTC coverage enhancement mode terminal coexist in a cell formed by base station 100.

Base station 100 according to Embodiment 2 indicates information on a PUCCH resource to each terminal 200 in advance. The information on a PUCCH resource is information on an offset value used for identifying a PUCCH resource number from a CCE number and a maximum number of PUCCH resources to be code-multiplexed per resource block (RB) placed in each PUCCH region.

In Embodiment 2, the normal mode and MTC coverage enhancement mode terminals are set with a common offset value. However, the normal mode and MTC coverage enhancement mode terminals are different in their associations between CCE numbers and PUCCH resource numbers.

More specifically, the normal mode terminal determines, as in Embodiment 1, resource number "$n_{PUCCH}$" of a PUCCH resource for transmission of an ACK/NACK signal, in accordance with Equation 1, and determines an OC index and cyclic shift value to be actually used.

Meanwhile, upon reception of downlink assignment control information (PDCCH or EPDCCH), the MTC coverage enhancement mode terminal determines resource number "$n_{PUCCH\_MTC}$" of a PUCCH resource for transmission of an ACK/NACK signal for downlink data (PDSCH) indicated by the corresponding assignment control information, using the following equation.

$$n_{PUCCH\_MTC} = N_{PUCCH}^{(1)} - 1 - n_{CCE} \quad \text{(Equation 3)}$$

In Equation 3, "$N_{PUCCH}^{(1)}$" represents an offset value for identifying a PUCCH resource number from a CCE number and is a value also included in Equation 1. Stated differently, offset value "$N_{PUCCH}^{(1)}$" which is identical to "$N_{PUCCH}^{(1)}$" for the normal mode terminals is set to the MTC coverage enhancement mode terminals. For example, base station 100 may indicate "$N_{PUCCH}^{(1)}$" to terminal 200 via a broadcast signal or higher layer signaling.

The MTC coverage enhancement mode terminal determines an OC index and cyclic shift value to be actually used, based on the determined PUCCH resource number "$n_{PUCCH\_MTC}$."

More specifically, when configured with the normal mode, terminal 200 (control section 213) adds offset value "$N_{PUCCH}^{(1)}$" to index "$n_{CCE}$" of a CCE used for PDCCH to calculate the PUCCH resource to be actually used for an ACK/NACK signal. Meanwhile, when configured with the MTC coverage enhancement mode, terminal 200 adds offset value "$N_{PUCCH\_MTC}^{(1)}$" to index "$n_{CCE}$" of a CCE used for PDCCH to calculate the PUCCH resource to be actually used for an ACK/NACK signal.

Figure 11:
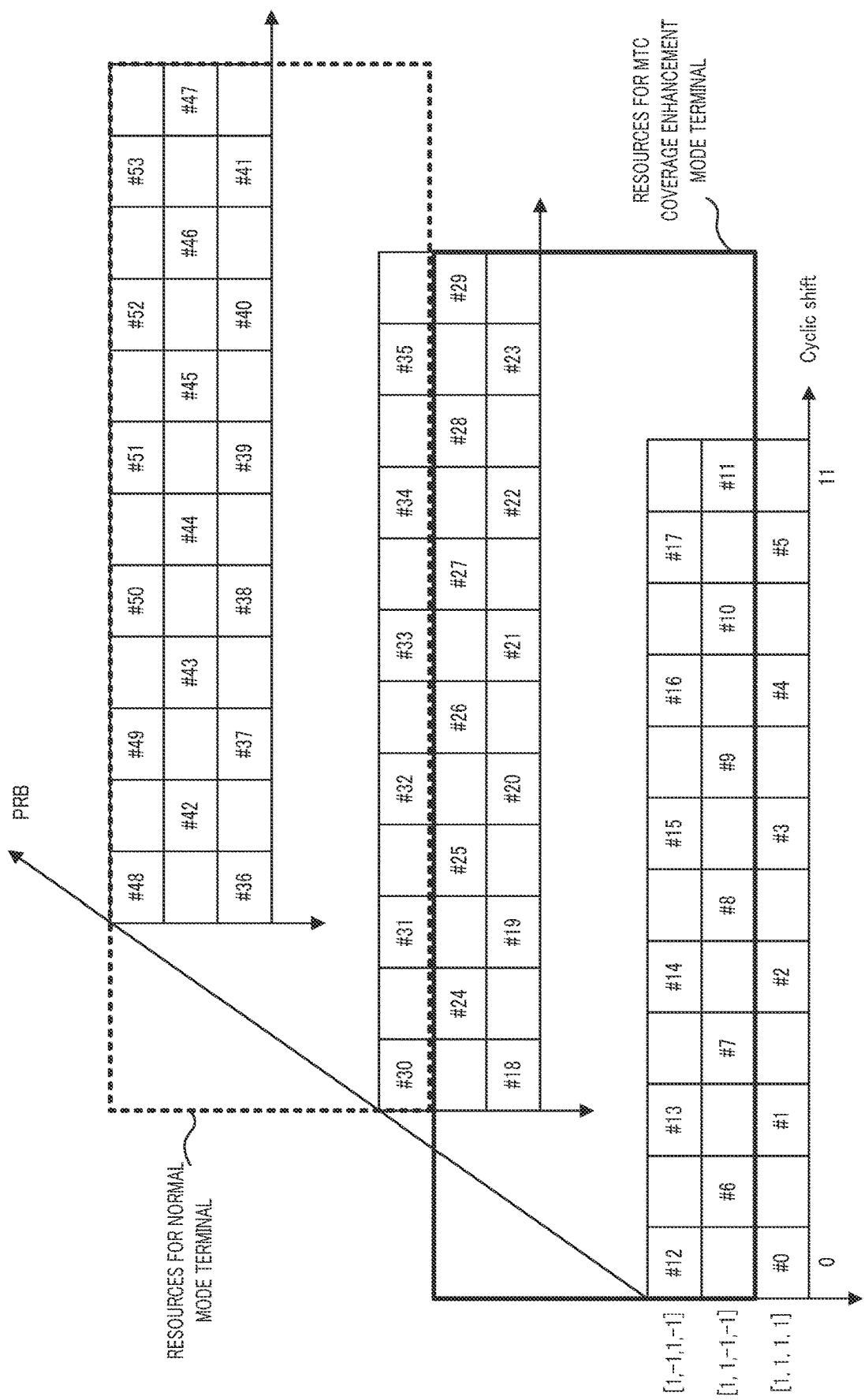
FIG. 11 is a diagram illustrating PUCCH resources according to Embodiment 2.

FIG. 11 illustrates an example of PUCCH resources for the normal mode and MTC coverage enhancement mode terminals.

In FIG. 11, 18 PUCCH resources are available among a maximum of 36 PUCCH resources for each RB as in the case of FIG. 10. In FIG. 11, 54 available PUCCH resources are assigned PUCCH resource numbers (#0 to #53), respectively, over three RBs.

In FIG. 11, offset value "$N_{PUCCH}^{(1)}$" for each terminal 200 is equal to 30.

More specifically, the normal mode terminal transmits an ACK/NACK signal using a PUCCH resource of PUCCH resource number "$n_{PUCCH} = n_{CCE} + 30$." Meanwhile, the MTC coverage enhancement mode terminal transmits an ACK/NACK signal using a PUCCH resource of PUCCH resource number "$n_{PUCCH\_MTC} = 30 - 1 - n_{CCE} (= 29 - n_{CCE})$."

Specifically, as illustrated in FIG. 11, PUCCH resource numbers #29 and #30 serve as boundaries, and PUCCH resource numbers #30 and above are configured as a PUCCH resource region for the normal mode terminals while PUCCH resource numbers #29 and below are configured as a PUCCH region for the MTC coverage enhancement mode terminals.

Accordingly, as illustrated in FIG. 11, the different PUCCH resource regions are configured for the normal mode and MTC coverage enhancement mode terminals, respectively. Stated differently, the PUCCH resource region is divided into a region for the normal mode terminals and a region for the MTC coverage enhancement mode terminals by setting different associations (i.e., Equations 1 and 3) for the normal mode and MTC coverage enhancement mode terminals, each of the associations being used for identifying a PUCCH resource number from a CCE number.

Hereinafter, a description will be given of a case where the CCE number corresponding to the PUCCH resource used for an ACK/NACK signal transmitted in the same subframe is CCE #0 (i.e., $n_{CCE} = 0$) as illustrated in FIG. 5, for example.

In this case, the normal mode terminal uses a PUCCH resource corresponding to PUCCH resource number "$n_{PUCCH} = 30 (= 0 + 30)$" in accordance with Equation 1.

Meanwhile, the MTC coverage enhancement mode terminal uses a PUCCH resource corresponding to PUCCH resource number "$n_{PUCCH\_MTC} = 29 (= 29 - 0)$" in accordance with Equation 3.

More specifically, in a case where the terminals of the two modes each transmit an ACK/NACK signal in the same subframe, even if the CCE number associated with a PUCCH resource for transmission of an ACK/NACK signal from the normal mode terminal and the CCE number associated with a PUCCH resource for transmission of an ACK/NACK signal from the MTC coverage enhancement mode terminal are both CCE #0, the PUCCH resources used by the respective terminals are different.

Stated differently, in a case where the terminals of the two modes each transmit an ACK/NACK signal in the same subframe, even if the CCE numbers (smallest index) used for the corresponding PDCCH are the same, a PUCCH resource collision between the normal mode terminal and MTC coverage enhancement mode terminal can be avoided.

As described above, according to Embodiment 2, PUCCH resources are determined for the normal mode and MTC coverage enhancement mode terminals using different associations with CCEs. As a result, the PUCCH resources available for the normal mode terminals are isolated from the PUCCH resources available for the MTC coverage enhancement mode terminals. Thus, even when the CCEs occupied by PDCCH used for the assignment of downlink data corresponding to the ACK/NACK signals to be transmitted in the same subframe are the same, the PUCCH resources used for the ACK/NACK signals can be different. Thus, a PUCCH resource collision in transmission of the ACK/NACK signals can be avoided.

Moreover, as described above, a PUCCH resource collision is avoided by setting different associations to the normal mode and MTC coverage enhancement mode terminals, each of the associations being used for identifying a PUCCH resource number. Accordingly, it is not necessary to add any restriction on PDCCH resource allocation. For this reason, Embodiment 2 does not involve any decrease in the utilization efficiency of PUCCH resources or any increase in scheduling complexity.

According to Embodiment 2, a PUCCH resource collision between the normal mode terminal and MTC coverage enhancement mode terminal can be avoided without any decrease in the utilization efficiency of PDCCH resources or any increase in scheduling complexity.

Moreover, the PUCCH resource allocation for the normal mode terminals (e.g., see Equation 1) has been already in practice in the LTE systems. In addition, the same parameter (offset value $N_{PUCCH}^{(1)}$) as that for the normal mode terminal is used for PUCCH resource allocation for the MTC coverage enhancement mode terminals. Thus, there is no parameter to be added for the MTC coverage enhancement mode terminals. For this reason, there is no influence on the operation of the current systems.

The associations for identifying PUCCH resource numbers from CCE numbers may be reversed between the normal and MTC coverage enhancement modes. In other words, the normal mode terminal may determine a PUCCH resource number using Equation 3, and the MTC coverage enhancement mode terminal may determine a PUCCH resource number using Equation 1. In MTC, terminals are not likely to perform communication so often, so that it is unlikely that the MTC coverage enhancement mode terminals use the PUCCH region so often. Moreover, in uplink, the PUSCH (Physical Uplink Shard Channel) region is placed in a center region of the system band, while the PUCCH regions are placed at the ends of the system band. In addition, the PUCCH resources (e.g., see FIG. 11) are assigned the PUCCH resource numbers in ascending order in a direction from the outer side to the inner side of the PUCCH regions. For this reason, the PUCCH region for the MTC coverage enhancement mode terminals, which is associated using Equation 1, and which is not used so often, is placed at the inner side of the frequency band in the uplink. Thus, the PUCCH region can be contiguous with the uplink data frequency band. In this configuration, when the PUCCH resources are not used by the MTC coverage enhancement mode terminals, these PUCCH resources can be used for uplink data (PUSCH). In addition, when the PUCCH region for the MTC coverage enhancement mode terminals is contiguous with the PUSCH region, a plurality of contiguous subcarriers can be collectively allocated to a specific terminal to prevent an increase in Peak-to-Average Power Ratio (PAPR).

Embodiment 3

The basic configurations of a base station and a terminal in Embodiment 3 are similar to those in Embodiment 1, so that a description will be given with reference to FIG. 8 (base station 100) and FIG. 9 (terminal 200).

Hereinafter, as in Embodiment 1, a description will be given of a case where a normal mode terminal and an MTC coverage enhancement mode terminal coexist in a cell formed by base station 100.

Base station 100 according to Embodiment 3 indicates information on a PUCCH resource to each terminal 200 in advance. The information on a PUCCH resource is information including a difference between cyclic shift values of available PUCCH resources adjacent to each other in a single orthogonal sequence of PUCCH resources (e.g., see FIG. 3), and a maximum number of PUCCH resources to be code-multiplexed per RB to be placed in each PUCCH region.

Moreover, the normal mode and MTC coverage enhancement mode terminals are configured with different PUCCH resource regions, respectively. Hereinafter, a description will be given of a case where a PUCCH resource is indicated implicitly in association with a CCE number as PUCCH resource allocation for the MTC coverage enhancement mode terminals. For example, the normal mode and MTC coverage enhancement mode terminals may be configured with PUCCH resources by the method used in Embodiment 1 or 2. In Embodiment 3, however, base station 100 may explicitly indicate a PUCCH resource to terminal 200 via higher layer signaling or the like as PUCCH resource allocation for the MTC coverage enhancement mode terminals.

In Embodiment 3, a difference between the cyclic shift values is independently configured for the normal mode and MTC coverage enhancement mode terminals.

Figure 12:
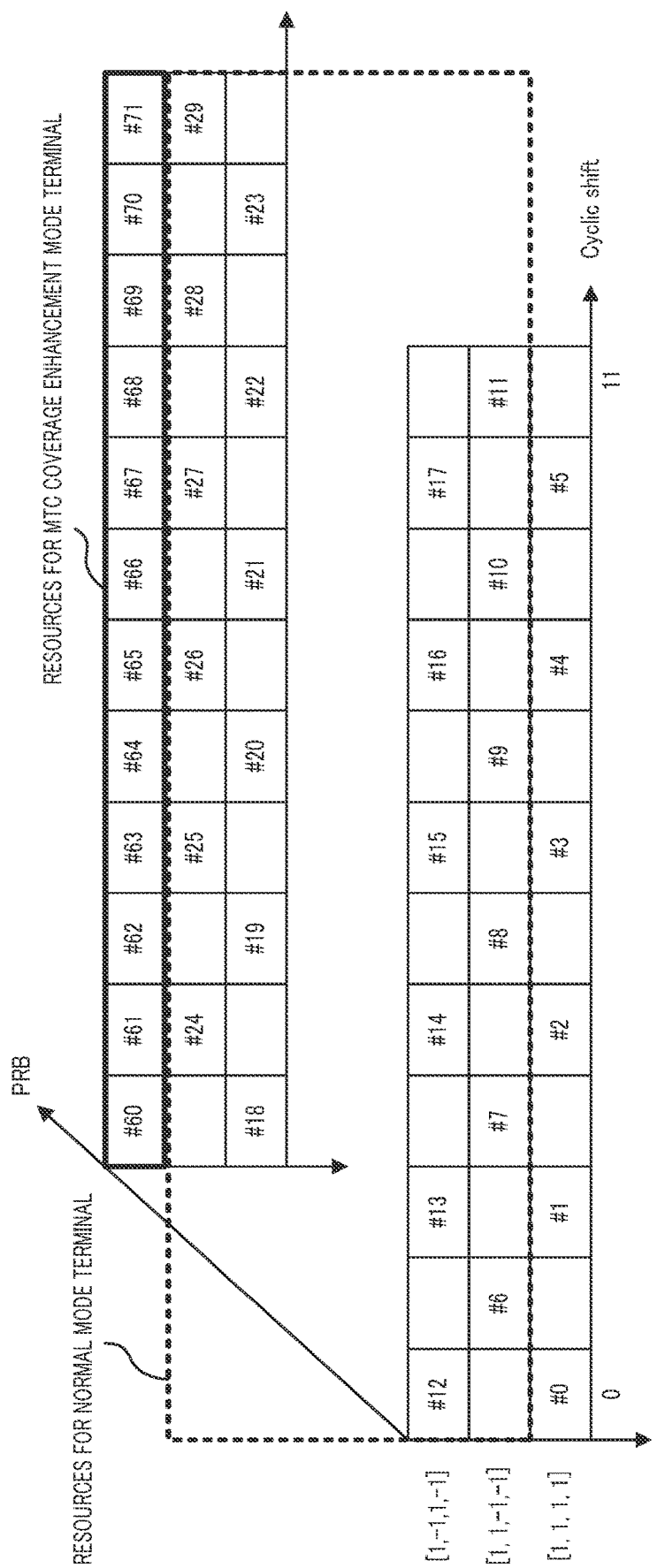
FIG. 12 is a diagram illustrating PUCCH resources according to Embodiment 3.

FIG. 12 illustrates an example of PUCCH resources for the normal mode and MTC coverage enhancement mode terminals according to Embodiment 3. FIG. 12 illustrates a total of 72 PUCCH resources of 2 RBs, and out of the 72 PUCCH resources, 12 PUCCH resources are secured for SPS/SR, 48 PUCCH resources are secured for the normal mode terminals, and the remaining 12 PUCCH resources are secured for the MTC coverage enhancement mode terminals.

As described above, the PUCCH resources illustrated in FIG. 12 are each defined by a combination of an orthogonal code sequence (OC index) and a cyclic shift value (cyclic shift index) of a ZAC sequence.

The normal mode terminal is configured with a cyclic shift value difference "$\Delta_{shift}^{PUCCH}$" between available resources adjacent to each other in a single orthogonal code sequence that defines a PUCCH resource. For example, in FIG. 12, the difference is set as $\Delta_{shift}^{PUCCH}=2$. More specifically, among 12 cyclic shift values (cyclic shift index=0 to 11) of a single orthogonal code sequence, a PUCCH resource corresponding to every other cyclic shift value is available. Accordingly, 18 PUCCH resources are available for the normal mode terminals out of a maximum of 36 PUCCH resources for each RB (PRB (Physical RB)).

In FIG. 12, upon reception of downlink assignment control information, the normal mode terminal may determine resource number "$n_{PUCCH}$" of a PUCCH resource for transmission of an ACK/NACK signal for the downlink data indicated by the corresponding downlink assignment control information, in accordance with Equation 1 (provided that $N_{PUCCH}^{(1)}=6$).

In FIG. 12, starting from PUCCH resource #0, 24 PUCCH resources of PUCCH resource numbers #6 to #29 among the PUCCH resources assigned the numbers corresponding to every other cyclic shift values in each orthogonal sequence are the PUCCH resources available for the normal mode terminals.

Meanwhile, the MTC coverage enhancement mode terminal is configured with a cyclic shift value difference "$\Delta_{shift}^{PUCCH\_MTC}$" between available resource adjacent to each other in a single orthogonal code sequence that defines PUCCH resources. For example, in FIG. 12, the difference is set as $\Delta_{shift}^{PUCCH\_MTC}=1$. More specifically, as a cyclic shift value difference between available PUCCH resources, the MTC coverage enhancement mode terminal is configured with a parameter different from a parameter configured for the normal mode terminal. More specifically, "$\Delta_{shift}^{PUCCH\_MTC}$" is smaller than "$\Delta_{shift}^{PUCCH}$".

More specifically, among 12 cyclic shift values (cyclic shift index=0 to 11) of a single orthogonal code sequence, the PUCCH resources corresponding to all contiguous cyclic shift values are available for the MTC coverage enhancement mode terminals.

In FIG. 12, upon reception of downlink assignment control information, the MTC coverage enhancement mode terminal may determine resource number "$n_{PUCCH\_MTC}$" of a PUCCH resource for transmission of an ACK/NACK signal for the downlink data indicated by the corresponding downlink assignment control information, in accordance with Equation 2 (provided that $N_{PUCCH\_MTC}^{(1)}=60$).

In FIG. 12, starting from PUCCH resource #0, 12 PUCCH resources of PUCCH resource numbers #60 to #71 among the PUCCH resources assigned the numbers corresponding to contiguous cyclic shift values in each orthogonal sequence are the PUCCH resources available for the MTC coverage enhancement mode terminals.

Note that, terminal 200 determines an OC index and cyclic shift value to be actually used, based on a PUCCH resource number. The association between PUCCH resource numbers, and OC indexes and cyclic shift values depends on a difference between adjacent cyclic shift values. Accordingly, in Embodiment 3, the associations for identifying OC indexes and cyclic shift values to be actually used from PUCCH resource numbers are different for the normal mode and MTC coverage enhancement mode terminals. More specifically, the MTC coverage enhancement mode terminal may replace "$\Delta_{shift}^{PUCCH}$" in an equation representing the association for identifying an OC index and cyclic shift value to be actually used, from a PUCCH resource number in the current systems (the equation is not illustrated) with $\Delta_{shift}^{PUCCH\_MTC}$ and operate.

In the current systems (e.g., 3GPP Release 11), PUCCH resources for the normal mode terminals are reserved. When an MTC coverage enhancement mode terminal is present in the current systems, in addition to the PUCCH resources for the normal mode terminals, PUCCH resources for the MTC coverage enhancement mode terminal are additionally configured as illustrated in FIG. 12.

As illustrated in FIG. 12, a maximum number of codes that can be multiplexed in each RB is identified by the number of available cyclic shift values among all possible cyclic shift values. More specifically, the maximum number of codes that can be multiplexed is identified in accordance with which n-th cyclic shift value (where "n" is an integer greater than 0) is available as a PUCCH resource (i.e., $\Delta_{shift}^{PUCCH}$ and $\Delta_{shift}^{PUCCH\_MTC}$).

In Embodiment 3, the maximum number of codes that can be multiplexed (i.e., difference between cyclic shift values) is configured independently for each of the normal mode and MTC coverage enhancement mode terminals. More specifically, among the combinations of the orthogonal code sequences and cyclic shift values defined as resources of a PUCCH resource group for the MTC coverage enhancement mode terminals, difference "$\Delta_{shift}^{PUCCH\_MTC}$" between cyclic shift values adjacent to each other in the same orthogonal sequence is smaller than difference "$\Delta_{shift}^{PUCCH}$" between cyclic shift values adjacent to each other in the same orthogonal sequence among the combinations of the orthogonal code sequences and cyclic shift values defined as resources of a PUCCH resource group for the normal mode terminals.

For this reason, in the PUCCH resource region for the MTC coverage enhancement mode terminals, the proportion of available PUCCH resources for each of the entire PUCCH resource regions becomes high as compared with the PUCCH resource region for the normal mode terminals. More specifically, as illustrated in FIG. 12, 24 PUCCH resources are available among 48 PUCCH resources in the PUCCH resource region for the normal mode terminals. In contrast to this, all 12 PUCCH resources are available in the PUCCH resource region for the MTC coverage enhancement mode terminals. Stated differently, the maximum number of codes that can be multiplexed for the MTC coverage enhancement mode terminals becomes the maximum.

More specifically, in Embodiment 3, setting the maximum number of codes that can be multiplexed in PUCCH resources for the MTC coverage enhancement mode terminals to be greater than the maximum number of codes that can be multiplexed in PUCCH resources for the normal mode terminals as described above makes it possible to reduce the overhead for PUCCH resources to the minimum level by increasing the number of available PUCCH resources.

For example, in order to make 12 PUCCH resources available, 24 PUCCH resources need to be secured when $\Delta_{shift}^{PUCCH\_MTC}=2$ but only 12 PUCCH resources need to be secured when $\Delta_{shift}^{PUCCH\_MTC}=1$. Thus, setting "$\Delta_{shift}^{PUCCH\_MTC}$" to be smaller than "$\Delta_{shift}^{PUCCH}$" makes it possible to reduce the overhead for PUCCH resources to the minimum level as compared with the case where "$\Delta_{shift}^{PUCCH\_MTC}$" is set equal to difference "$\Delta_{shift}^{PUCCH}$" between the cyclic shift values configured for the normal mode terminals.

It is worth noting that, the PUCCH resources not used in code-multiplexing among the PUCCH resources of the same RB contribute to a reduction in inter-code interference because of the inter-code interference suppression effect brought about by code-spreading. For example, as illustrated in FIG. 12, there are unused PUCCH resources between the available adjacent resources of PUCCH resources #6 to #29

(PUCCH resources not used in code-multiplexing) among the PUCCH resources for the normal mode terminals, which in turn, makes a contribution to a suppression in inter-code interference.

In contrast to this, as illustrated in FIG. 12, there is no PUCCH resource that is not used in code-multiplexing among the PUCCH resources for the MTC coverage enhancement mode terminals.

However, taking the traffic characteristics of MTC into account, it is unlikely that the terminals in MTC perform communication so often. In other words, the use frequency of PUCCH resources for the MTC coverage enhancement mode terminals is stochastically low. For this reason, even if the maximum number of codes that can be multiplexed is increased in the PUCCH resources for the MTC coverage enhancement mode terminals in the same RB, the possibility of resources corresponding to cyclic shift values adjacent to each other in the same sequence being used simultaneously is low because the number of terminals to be code-multiplexed simultaneously is few. More specifically, the possibility of occurrence of inter-code interference due to the simultaneous use of resources corresponding to the adjacent cyclic shift values is low, so that it is unlikely that the propagation characteristics of ACK/NACK signals are reduced.

Moreover, taking the communication environment of MTC into account, it is likely that the coding rate of control information for the MTC coverage enhancement mode terminals is set low, and that the number of CCEs occupied by L1/L2 CCH forming the PDCCH is relatively large. For this reason, when a PUCCH resource number is implicitly indicated to the MTC coverage enhancement mode terminal by a CCE number, it is very likely that the CCEs of adjacent numbers are used by the same terminal. Thus, it is less likely that the PUCCH resources of adjacent numbers (i.e., resources corresponding to adjacent cyclic shift values) are simultaneously used.

As described above, even if the difference between adjacent cyclic shift values is set low for the MTC coverage enhancement mode terminals as compared with the normal mode terminals, there is practically no reduction in the performance of ACK/NACK signals due to an increase in the maximum number of codes that can be multiplexed. The reason behind this is that the probability of actual use in the PUCCH resource region is low, where the maximum number of codes that can be multiplexed in the same RB is increased.

As described above, according to Embodiment 3, the normal mode and MTC coverage enhancement mode terminals are configured with PUCCH resources using mutually different cyclic shift value differences (i.e., maximum number of codes that can be multiplexed). Thus, it is possible to reduce the overhead for the PUCCH resources to the minimum level in the system where the normal mode and MTC coverage enhancement mode terminals coexist.

In addition, the PUCCH resource allocation for the normal mode terminals has been already in practice in the LTE systems. Thus, base station 100 only needs to additionally indicate, to terminal 200, difference "$\Delta_{shift}^{PUCCH\_MTC}$" between cyclic shift values independently used during PUCCH resource allocation for the MTC coverage enhancement mode terminals. Thus, there is no major influence on the operation of the current systems.

In addition, according to Embodiment 3, a PUCCH resource collision in transmission of ACK/NACK signals can be avoided by setting different PUCCH resources used for transmission of ACK/NACK signals to the normal mode and MTC coverage enhancement mode terminals.

Note that, Embodiment 3 has been described with a case where the normal mode terminals (i.e., terminals to which repetition is not applied) and the MTC coverage enhancement mode terminals (i.e., terminals to which repetition is applied) are configured with PUCCH resources using different cyclic shift value differences (i.e., the maximum number of codes that can be multiplexed). Embodiment 3 is not limited to this case, however, and groups of terminals in the same cell (e.g., a group of terminals served by macro base station and a group of terminals served by a remote antenna station in the same cell) may be configured with PUCCH resources using different cyclic shift value differences (i.e., the maximum number of codes that can be multiplexed).

Embodiment 4

As described above, the CCE numbers and PUCCH resource numbers are associated with each other in one-to-one correspondence in the current systems. Stated differently, M CCEs are associated with M PUCCH resources (i.e., the number of CCEs and the number of PUCCH resources are the same), respectively. For example, in FIG. 12, for the MTC coverage enhancement mode terminals, CCE #0, CCE #1, CCE #2, and so forth are associated with PUCCH resource #60, PUCCH resource #61, PUCCH resource #62, and so forth, respectively.

Moreover, it is likely that a low coding rate is set for the control information for the MTC coverage enhancement mode terminals for the purpose of limiting the deterioration of error rate performance. More specifically, the number of CCEs occupied by L1/L2 CCH forming PDCCH for the MTC coverage enhancement mode terminals is expected to be relatively large. For example, it is likely that a larger value (4, 8) among possible numbers of CCEs to be occupied (may be referred to as "aggregation level") (e.g., 1, 2, 4, 8) is set for the MTC coverage enhancement mode terminals.

As described above, when L1/L2 CCH occupies a plurality of CCEs in PDCCH for the MTC coverage enhancement mode terminal, the terminal transmits an ACK/NACK signal using a PUCCH resource corresponding to one CCE (CCE having the smallest index) among the plurality of CCEs. Accordingly, the PUCCH resources corresponding to the CCEs other than the CCE corresponding to the PUCCH resource used for transmission of the ACK/NACK signal are not used and wasted. For example, in FIG. 12, when L1/L2 CCH forming the PDCCH for the MTC coverage enhancement mode terminal occupies four CCEs, CCE #0 to CCE #3, the terminal transmits an ACK/NACK signal using only PUCCH resource #60, which corresponds to the smallest index, CCE #0, among the four CCEs. As a result, the physical resources of PUCCH resource #61 to PUCCH resource #63, which correspond to CCE #1 to CCE #3, are not used and thus wasted.

However, taking the traffic characteristics of MTC into account, it is unlikely that the terminals in MTC perform communication so often. In other words, the use frequency of PUCCH resources for the MTC coverage enhancement mode terminals is stochastically low.

In this respect, in Embodiment 4, instead of associating M CCEs with M PUCCH resources in one to one correspondence for the MTC coverage enhancement mode terminals, M CCEs are associated with the number of PUCCH resources smaller than M. In other words, one PUCCH resource is associated with a plurality of CCEs for the MTC coverage enhancement mode terminals.

The basic configurations of a base station and a terminal in Embodiment 4 are similar to those in Embodiment 1, so that a description will be given with reference to FIG. 8 (base station 100) and FIG. 9 (terminal 200).

Base station 100 and terminal 200 hold an association between CCEs and PUCCH resources according to Embodiment 4 in advance.

Hereinafter, Methods 1 and 2 for associating CCEs and PUCCH resources according to Embodiment 4 will be each described.

Note that, in Embodiment 4, as illustrated in FIG. 12, for example, the normal mode and MTC coverage enhancement mode terminals are configured with different PUCCH resource regions, respectively. For example, the normal mode and MTC coverage enhancement mode terminals may be configured with PUCCH resources, using the same method as that of Embodiment 1 or 2. However, in Embodiment 4, base station 100 may explicitly indicate a PUCCH resource to terminal 200 via higher layer signaling or the like as PUCCH resource allocation for the MTC coverage enhancement mode terminals. Note that, a cyclic shift value difference between PUCCH resources available for the MTC coverage enhancement mode terminals is set to 1 (i.e., $\Delta_{shift}^{PUCCH\_MTC}=1$) as in Embodiment 3.

Hereinafter, a description will be given with focus on the PUCCH resources (#60 to #71) for the MTC coverage enhancement mode terminals.

<Method 1 (FIG. 13)>

Method 1 is a method in which an association between CCE numbers and PUCCH resources is set based on a ratio of N to 1.

Figure 13:
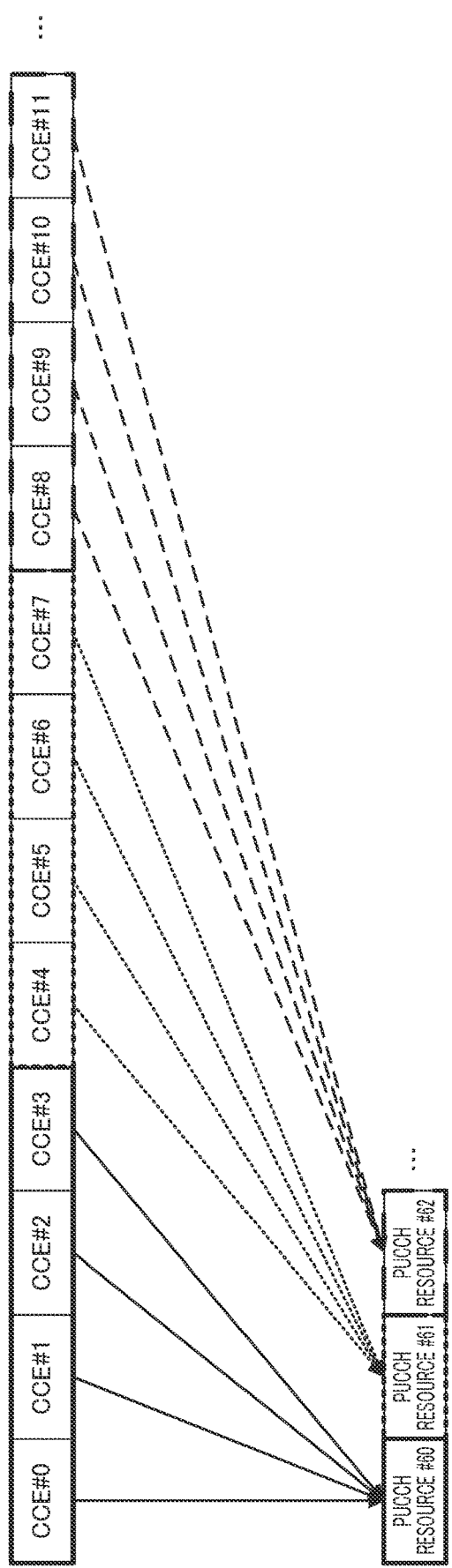
FIG. 13 is a diagram illustrating an association between CCEs and PUCCH resources according to Embodiment 4.

For example, FIG. 13 illustrates an example in which an association between CCE numbers and PUCCH resources is set based on a ratio of N to 1 where N=4.

As illustrated in FIG. 13, four CCEs, CCE #0 to CCE #3, are associated with PUCCH resource #60, four CCEs, CCE #4 to CCE #7 are associated with PUCCH resource #61, and four CCEs, CCE #8 to CCE #11 are associated with PUCCH resource #62.

For example, when the CCE of the smallest index among the CCEs occupied by L1/L2 CCH forming PDCCH intended for terminal 200 is any one of CCE #0 to CCE #3, the MTC coverage enhancement mode terminal transmits an ACK/NACK signal using PUCCH resource #60. Likewise, when the CCE of the smallest index among the CCEs allocated to the MTC coverage enhancement mode terminals is any one of CCE #4 to CCE #7, PUCCH resource #61 is used for transmission of the ACK/NACK signal, and when the CCE of the smallest index is any one of CCE #8 to CCE #11, PUCCH resource #62 is used for transmission of the ACK/NACK signal.

For example, PUCCH resource number "$n_{PUCCH\_MTC}$" used by the MTC coverage enhancement mode terminals is determined in accordance with the following equation.

$$n_{PUCCH\_MTC}=\text{floor}(n_{CCE}/N)+N_{PUCCH\_MTC}^{(1)} \quad \text{(Equation 4)}$$

In Equation 4, the function "floor(X)" represents a floor function that returns a largest integer not greater than X. In addition, "$n_{CCE}$" represents the smallest CCE number among the CCEs occupied by PDCCH, and "N" represents the number of CCEs associated with one PUCCH resource (e.g., N=4 in FIG. 13). In addition, "$N_{PUCCH\_MTC}^{(1)}$" represents an offset value for the MTC coverage enhancement mode terminals. For example, $N_{PUCCH\_MTC}^{(1)}=60$ in FIG. 13.

According to Method 1, the PUCCH resource region to be secured for the MTC coverage enhancement mode terminals is reduced to 1/N compared with the case where the CCE numbers and PUCCH resource numbers are associated with each other in one to one correspondence. More specifically, when the CCE numbers and PUCCH resource numbers are associated with each other in one to one correspondence, 12 PUCCH resources need to be secured for 12 CCEs, but Method 1 requires only 3 PUCCH resources to be secured for 12 CCEs in the case of FIG. 13 (where N=4).

<Method 2>

Method 2 is a method in which the number of CCEs to be associated with one PUCCH resource is set to a value that can be taken as the number of occupied CCEs (aggregation level).

For example, let us suppose that the number of CCEs occupied for the MTC coverage enhancement mode terminals is set to N (>1) in Method 2.

Figure 14:
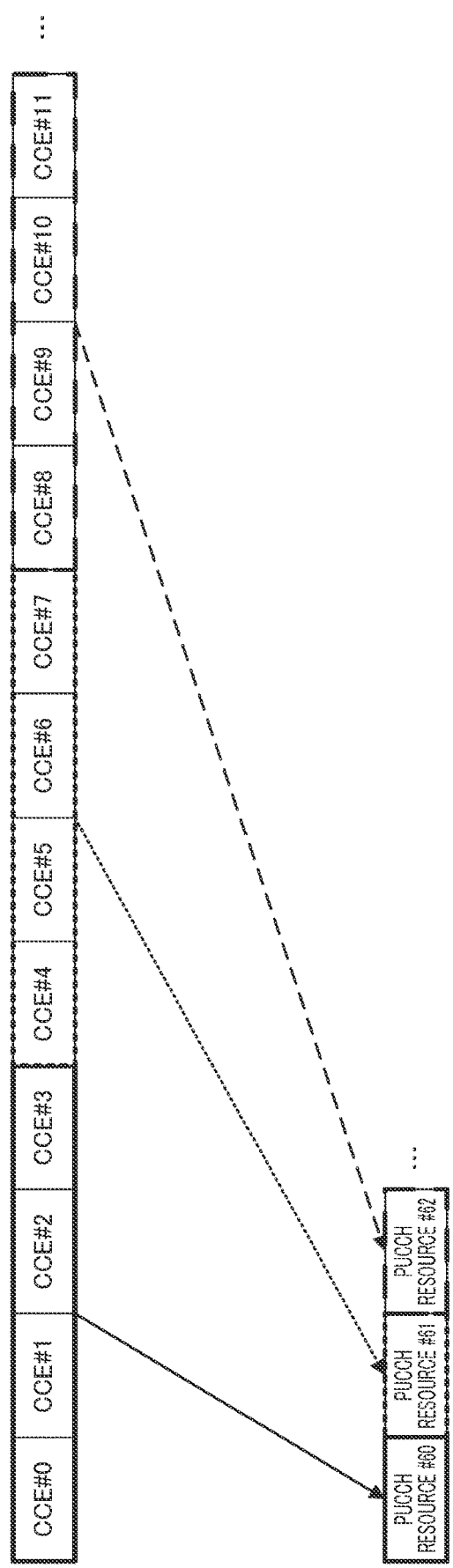
FIG. 14 is a diagram illustrating an association between CCEs and PUCCH resources according to Embodiment 4.

FIG. 14 illustrates an example of an association between the CCE numbers and PUCCH resource numbers when N=4, for example.

As illustrated in FIG. 14, four CCEs, CCE #0 to CCE #3 are associated with PUCCH resource #60, four CCEs, CCE #4 to CCE #7 are associated with PUCCH resource #61, and four CCEs, CCE #8 to CCE #11 are associated with PUCCH resource #62. More specifically, one PUCCH resource is associated with every set of N occupied CCEs.

The MTC coverage enhancement mode terminal is allocated CCEs in units of four CCEs as illustrated in FIG. 14. For example, when the CCEs occupied by L1/L2 CCH forming PDCCH intended for terminal 200 are CCE #0 to CCE #3, the MTC coverage enhancement mode terminal transmits an ACK/NACK signal using PUCCH resource #60. Likewise, when the MTC coverage enhancement mode terminal is allocated CCE #4 to CCE #7, the MTC coverage enhancement mode terminal transmits the ACK/NACK signal using PUCCH resource #61, and when the MTC coverage enhancement mode terminal is allocated CCE #8 to CCE #11, the MTC coverage enhancement mode terminal transmits the ACK/NACK signal using PUCCH resource #62.

For example, PUCCH resource number "$n_{PUCCH\_MTC}$" is determined in accordance with the following equation.

$$n_{PUCCH\_MTC}=n_{CCE}/N+N_{PUCCH\_MTC}^{(1)} \quad \text{(Equation 5)}$$

In Equation 5, "$n_{CCE}$" represents the smallest CCE number among the CCEs occupied by PDCCH, and "N" represents the number of CCEs occupied for the MTC coverage enhancement mode terminals (e.g., N=4 in FIG. 14). In addition, "$N_{PUCCH\_MTC}^{(1)}$" represents an offset value for the MTC coverage enhancement mode terminals. For example, $N_{PUCCH\_MTC}^{(1)}=60$ in FIG. 14.

According to Method 2, the PUCCH resource region to be secured for the MTC coverage enhancement mode terminals is reduced to 1/N compared with the case where the CCE numbers and PUCCH resource numbers are associated with each other in one to one correspondence. More specifically, when CCE numbers are PUCCH resource numbers are associated in one to one correspondence, 12 PUCCH resources need to be secured for 12 CCEs, but Method 2 requires only 3 PUCCH resources to be secured for 12 CCEs in the case of FIG. 14 (where N=4).

Moreover, each PUCCH resource is associated with CCEs in units of CCEs occupied for each terminal, so that there is no chance that N CCEs associated with one PUCCH resource are simultaneously used by a plurality of terminals.

Methods 1 and 2 have been described thus far.

As described above, in Embodiment 4, one PUCCH resource is associated with a plurality of CCEs for the MTC coverage enhancement mode terminal. Thus, it is possible to avoid an increase in resources to be reserved as a PUCCH resource for the MTC coverage enhancement mode terminals. Accordingly, even in a system in which an MTC coverage enhancement mode terminal exists (i.e., case where a PUCCH resource for the MTC coverage enhancement mode terminal is additionally configured), an increase in the overhead for PUCCH resources can be avoided.

In addition, according to Embodiment 4, a PUCCH resource collision in transmission of ACK/NACK signals can be avoided by setting different PUCCH resources used for transmission of the ACK/NACK signals to the normal mode and MTC coverage enhancement mode terminals.

Embodiment 5

Implicitly indicating a PUCCH resource number in association with a CCE number to the MTC coverage enhancement mode terminals in the same manner as the current systems may cause a PUCCH resource collision because ACK/NACK signals may be simultaneously transmitted using the same PUCCH resource from the terminals when a terminal configured with PDCCH and PUCCH of different repetition levels exists.

Figure 15:
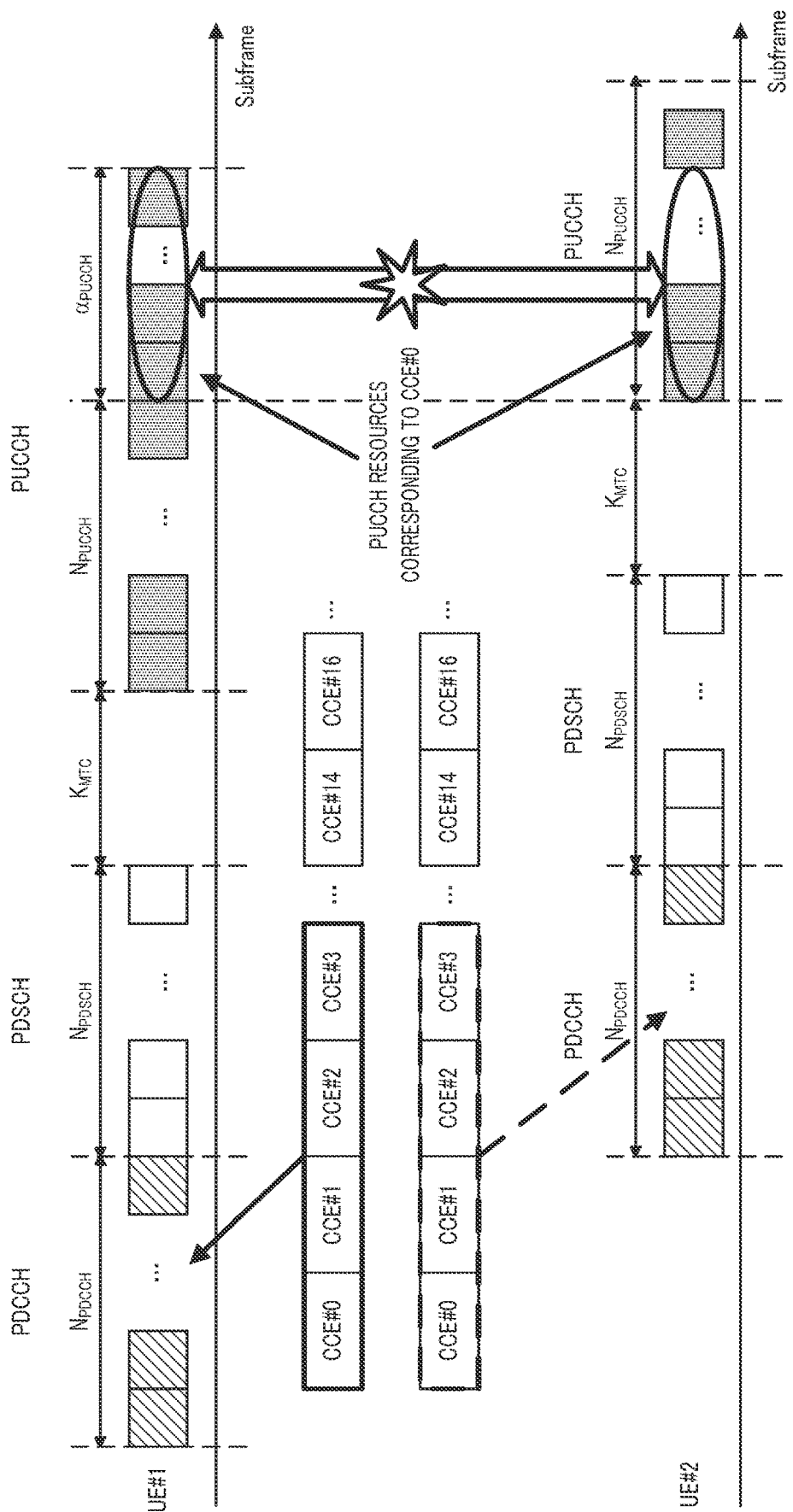
FIG. 15 is a diagram illustrating an example of a PUCCH resource collision according to Embodiment 5.

FIG. 15 illustrates an example of the case where PUCCH resources for the MTC coverage enhancement mode terminals collide with each other. In FIG. 15, "$N_{PDCCH}$" and "$N_{PDSCH}$" represent the repetition levels of PDCCH and PDSCH of each of terminal 1 (UE #1) and terminal 2 (UE #2). In addition, "$N_{PUCCH}+\alpha_{PUCCH}$" represents the repetition level of PUCCH of terminal 1, and "$N_{PUCCH}$" represents the repetition level of PUCCH of terminal 2. More specifically, "$N_{PDCCH}$" and "$N_{PDSCH}$" of terminal 1 are identical to those of terminal 2, but the repetition level of PUCCH of terminal 1 is greater than that of terminal 2 by "$\alpha_{PUCCH}$."

In FIG. 15, PDCCH is transmitted to terminal 1 using CCE #0 to CCE #3. Meanwhile, PDCCH is transmitted to terminal 2 using CCE #0 to CCE #3 in the subframe subsequent to the subframe in which the transmission of PDCCH to terminal 1 has been completed. Stated differently, both terminals 1 and 2 transmit an ACK/NACK signal using a PUCCH resource associated with CCE #0.

As illustrated in FIG. 15, terminal 1 transmits an ACK/NACK signal over "$N_{PUCCH}+\alpha_{PUCCH}$" subframes, while terminal 2 transmits an ACK/NACK signal on "$N_{PUCCH}$" in the subframe subsequent to the subframe in which terminal 1 has transmitted an ACK/NACK signal on "$N_{PUCCH}$." For this reason, as illustrated in FIG. 15, the PUCCH resources for the terminals collide with each other in the subframe corresponding to the "$\alpha_{PUCCH}$" subframe of the last half of PUCCH repetition of terminal 1 and the "$\alpha_{PUCCH}$" subframe of the top half of PUCCH repetition of terminal 2.

In this respect, in Embodiment 5, a method for avoiding a PUCCH resource collision in transmission of ACK/NACK signals from the MTC coverage enhancement mode terminals will be described.

The basic configurations of a base station and a terminal in Embodiment 5 are similar to those in Embodiment 1, so that a description will be given with reference to FIG. 8 (base station 100) and FIG. 9 (terminal 200).

Specifically, when the repetition levels of PDCCH and PUCCH are different, terminal 200 (MTC coverage enhancement mode terminal) transmits an ACK/NACK signal using a PUCCH resource implicitly indicated in association with a CCE number (i.e., smallest CCE number) for the number of subframes corresponding to the repetition level of PDCCH during the PUCCH repetition.

Meanwhile, terminal 200 transmits an ACK/NACK signal using an explicitly allocated PUCCH resource in a subframe exceeding the repetition level of PDCCH. The PUCCH resource is previously indicated to terminal 200 by base station 100.

Figure 16:
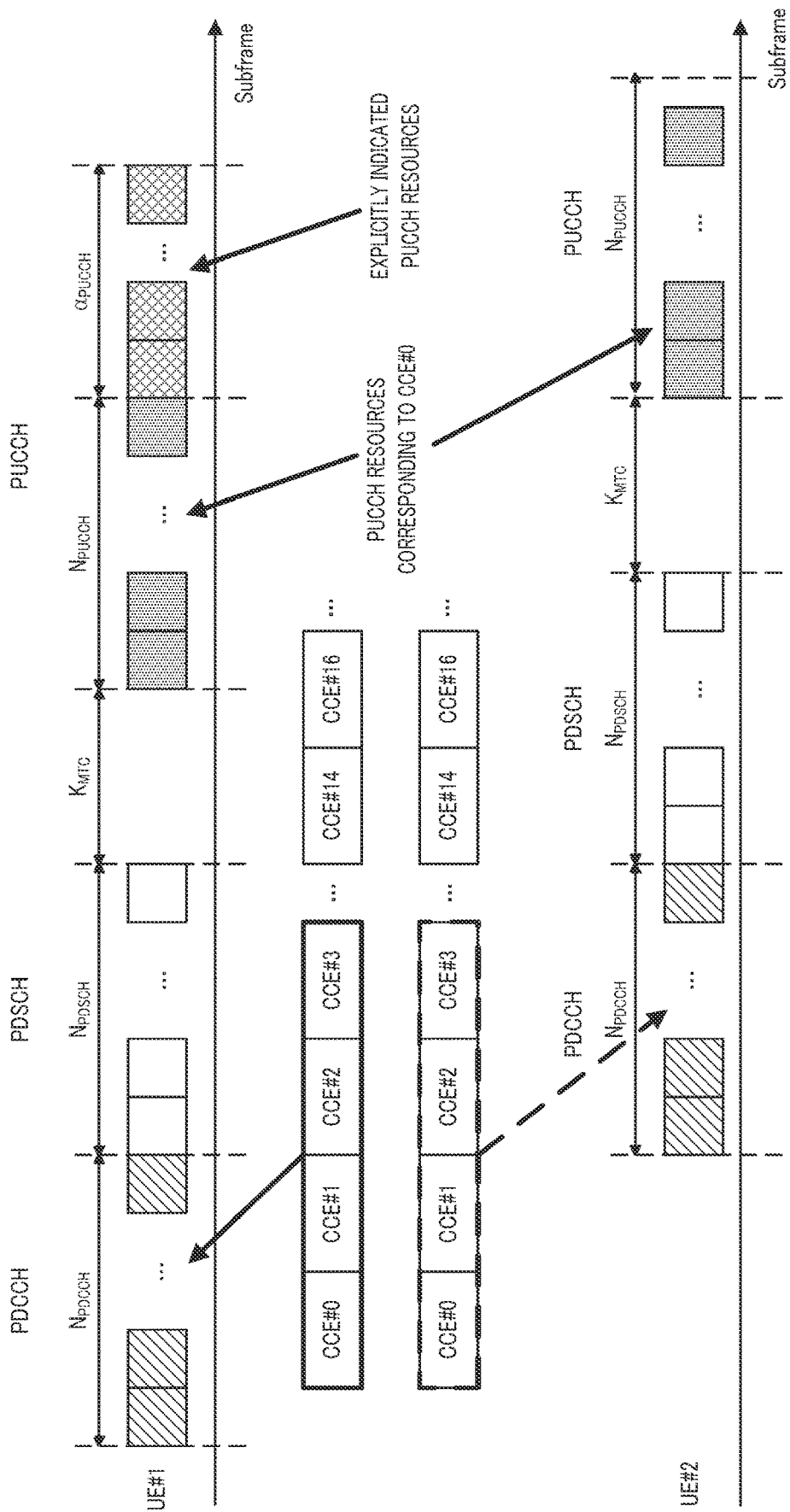
FIG. 16 is a diagram illustrating the transmission timing of each channel according to Embodiment 5.

FIG. 16 illustrates the transmission timing of each channel in Embodiment 5. In FIG. 16, "$N_{PDCCH}$" and "$N_{PDSCH}$" represent the repetition levels of PDCCH and PDSCH of each of terminal 1 (UE #1) and terminal 2 (UE #2) as in the case of FIG. 15. In addition, "$N_{PUCCH}+\alpha_{PUCCH}$" represents the repetition level of PUCCH of terminal 1, and "$N_{PUCCH}$" represents the repetition level of PUCCH of terminal 2. Note that, "$N_{PUCCH}$" and "$N_{PDCCH}$" are the same in FIG. 16.

Moreover, in FIG. 16, PDCCH is transmitted to terminal 1 using CCE #0 to CCE #3. Meanwhile, PDCCH is transmitted to terminal 2 using CCE #0 to CCE #3 in the subframe subsequent to the subframe in which the transmission of PDCCH to terminal 1 has been completed.

In this case, as illustrated in FIG. 16, terminal 1 transmits an ACK/NACK signal using a PUCCH resource associated with CCE #0 of the smallest index among the CCEs used for PDCCH, for the number of $N_{PUCCH}$ subframes corresponding to the number of "$N_{PDCCH}$" subframes among "$N_{PUCCH}+\alpha_{PUCCH}$" subframes during PUCCH repetition.

Meanwhile, terminal 1 transmits an ACK/NACK signal using an explicitly indicated PUCCH resource in an "$\alpha_{PUCCH}$" subframe exceeding the "$N_{PUCCH}$" subframe among "$N_{PUCCH}+\alpha_{PUCCH}$" subframes.

In addition, as illustrated in FIG. 16, terminal 2 transmits an ACK/NACK signal using a PUCCH resource associated with CCE #0 of the smallest index among the CCEs used for PDCCH in the "$N_{PUCCH}$" subframe subsequent to the "$N_{PUCCH}$" subframe in which terminal 1 has transmitted an ACK/NACK signal, during the PUCCH repetition.

More specifically, in FIG. 16, terminals 1 and 2 use mutually different PUCCH resources in the subframe corresponding to the "$\alpha_{PUCCH}$" subframe of the last half of PUCCH repetition of terminal 1 and the "$N_{PUCCH}$" subframe of the top half of PUCCH repetition of terminal 2. As a result, no PUCCH resource collision occurs between terminals 1 and 2.

As described above, among a plurality of subframes used for repeatedly transmitting an ACK/NACK signal, terminal 200 transmits an ACK/NACK signal using a PUCCH resource associated with a CCE used in PDCCH among the PUCCH resources for the MTC coverage enhancement mode terminals, in a subframe not greater than the repetition level of PDCCH, and transmits an ACK/NACK signal using any of previously configured PUCCH resources, in a subframe exceeding the repetition level of PDCCH.

In this manner, in a case where an MTC coverage enhancement mode terminal configured with PDCCH and PUCCH of different repetition levels is present, even if there occurs a subframe in which ACK/NAC signals are simultaneously transmitted from the MTC coverage enhancement mode terminals to which PDCCH has been transmitted using the same CCE, a PUCCH resource collision in transmission of the ACK/NACK signals from the terminals can be avoided.

It should be noted that, Embodiment 5 may be combined with the operation of Embodiments 1 to 4. In other words, Embodiment 5 may be applied to the method for avoiding a PUCCH resource collision between the MTC coverage enhancement mode terminals, and any one of Embodiments 1 to 4 may be applied to the method for avoiding a PUCCH resource collision between the normal mode terminal and MTC coverage enhancement mode terminal.

Embodiment 6

Embodiment 5 has been described with respect to a terminal configured with PDCCH and PUCCH of different repetition levels. Embodiment 6, on the other hand, will be described with respect to a case where each terminal is configured with PDCCH and PUCCH of the same repetition levels, but the repetition levels of PDCCH and PUCCH configured for the terminals are different.

In this case, implicitly indicating a PUCCH resource number in association with a CCE number to the MTC coverage enhancement mode terminals in the same manner as the current systems may cause a PUCCH resource collision because ACK/NACK signals may be simultaneously transmitted using the same PUCCH resource from the terminals.

Figure 17:
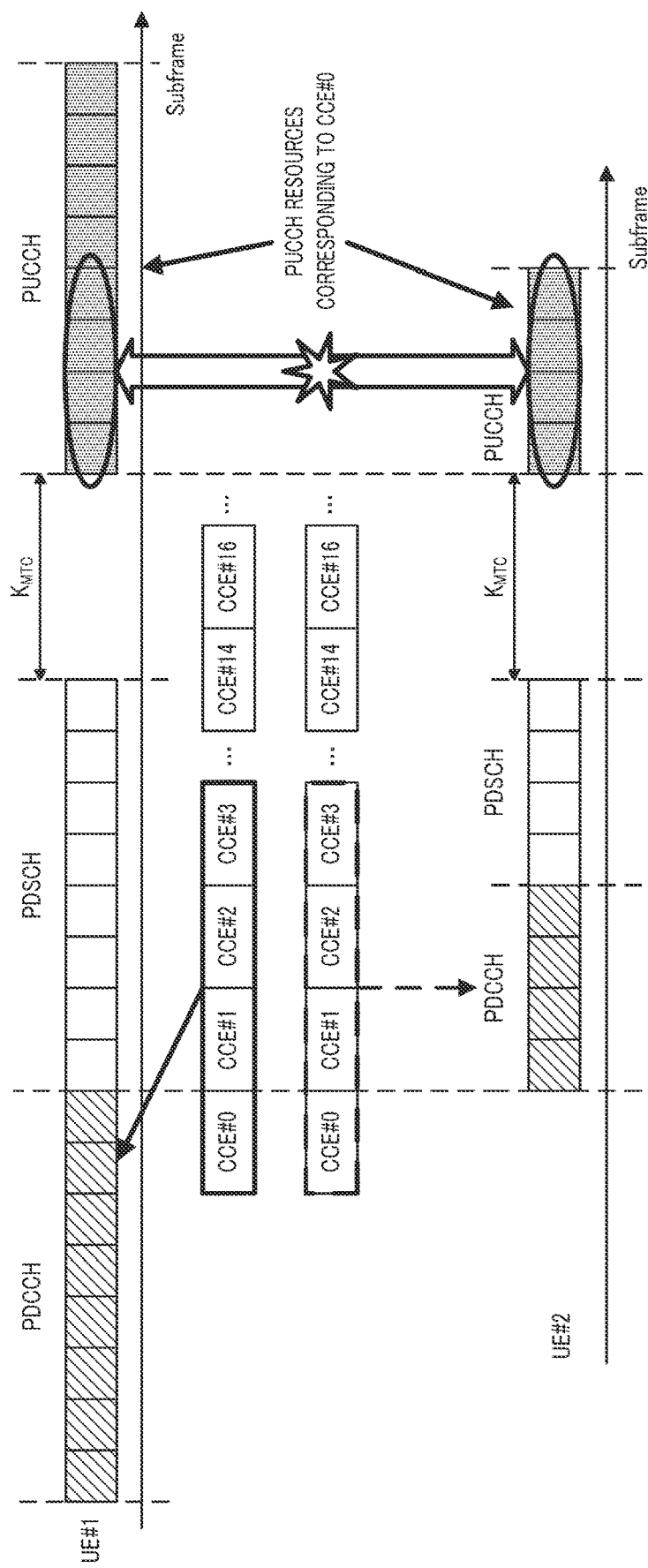
FIG. 17 is a diagram illustrating an example of a PUCCH resource collision according to Embodiment 6.

FIG. 17 illustrates an example of a case where PUCCH resources used by the MTC coverage enhancement mode terminals collide with each other. In FIG. 17, the repetition levels of PDCCH, PDSCH, and PUCCH for terminal 1 (UE #1) are 8, and the repetition levels of PDCCH, PDSCH, and PUCCH for terminal 2 (UE #2) are 4.

In FIG. 17, PDCCH is transmitted to terminal 1 using CCE #0 to CCE #3. Meanwhile, PDCCH is transmitted to terminal 2 using CCE #0 to CCE #3 in the subframe subsequent to the subframe in which the transmission of PDCCH to terminal 1 has been completed. Stated differently, both terminals 1 and 2 transmit an ACK/NACK signal using a PUCCH resource associated with CCE #0.

As illustrated in FIG. 17, terminal 1 receives PDCCH over 8 subframes and receives PDSCH over the next 8 subframes. Meanwhile, terminal 2 receives PDCCH over 4 subframes subsequent to the subframe in which terminal 1 has completed reception of PDCCH and receives PDSCH over the next 4 subframes. More specifically, terminals 1 and 2 complete the reception of PDSCH at the same timing (or start transmission of an ACK/NACK signal at the same timing).

In this case, terminal 1 transmits an ACK/NACK signal over 8 subframes, and terminal 2 transmits an ACK/NACK signal over 4 subframes at the same timing. As a result, as illustrated in FIG. 17, a PUCCH resource collision occurs in the subframes corresponding to the 4 subframes of the top half of PUCCH repetition of terminal 1 and the 4 subframes corresponding to the whole subframes of PUCCH repetition of terminal 2.

In this respect, Embodiment 6 will be described with respect to a method for avoiding a PUCCH resource collision in transmission of ACK/NACK signals from the MTC coverage enhancement mode terminals configured with different repetition levels.

The basic configurations of a base station and a terminal in Embodiment 6 are similar to those in Embodiment 1, so that a description will be given with reference to FIG. 8 (base station 100) and FIG. 9 (terminal 200).

Specifically, terminal 200 (MTC coverage enhancement mode terminal) transmits an ACK/NACK signal using a PUCCH resource implicitly indicated in association with a CCE number used in transmission of PDCCH (i.e., smallest CCE number) during PUCCH repetition. Terminal 200, however, transmits an ACK/NACK signal using a PUCCH resource identified by using a different offset value for each configured repetition level.

For example, PUCCH resource number "$n_{PUCCH\_MTC\_4}$" used when the repetition level is 4, and PUCCH resource number "$n_{PUCCH\_MTC\_8}$" used when the repetition level is 8 are determined in accordance with the following equations.

$$n_{PUCCH\_MTC\_8} = n_{CCE} + N_{PUCCH\_MTC\_8}^{(1)} \quad \text{(Equation 6)}$$

$$n_{PUCCH\_MTC\_4} = n_{CCE} + N_{PUCCH\_MTC\_4}^{(1)} \quad \text{(Equation 7)}$$

In Equations 6 and 7, "$n_{CCE}$" represents the CCE number (integer not less than 0) of a CCE occupied by PDCCH. In addition, "$N_{PUCCH\_MTC\_8}^{(1)}$" represents an offset value for identifying the PUCCH resource number from the CCE number when the repetition level is 8, while "$N_{PUCCH\_MTC\_4}^{(1)}$" represents an offset value for identifying the PUCCH resource number from the CCE number when the repetition level is 4 in Equations 6 and 7.

Different values are set to $N_{PUCCH\_MTC\_4}^{(1)}$ and $N_{PUCCH\_MTC\_8}^{(1)}$, respectively. In other words, PUCCH resources available for terminal 200 are at least divided into PUCCH resources used when the repetition level is 4 and PUCCH resources used when the repetition level is 8. More specifically, a PUCCH resource group available for terminal 200 includes a plurality of sub-resource groups for the respective repetition levels for an ACK/NACK signal.

Note that, hereinafter, a description will be given of a case where the repetition levels are 4 and 8, but the repetition levels are not limited to 4 or 8, and when a different value is used, an offset value is configured for the value in the same manner.

Figure 18:
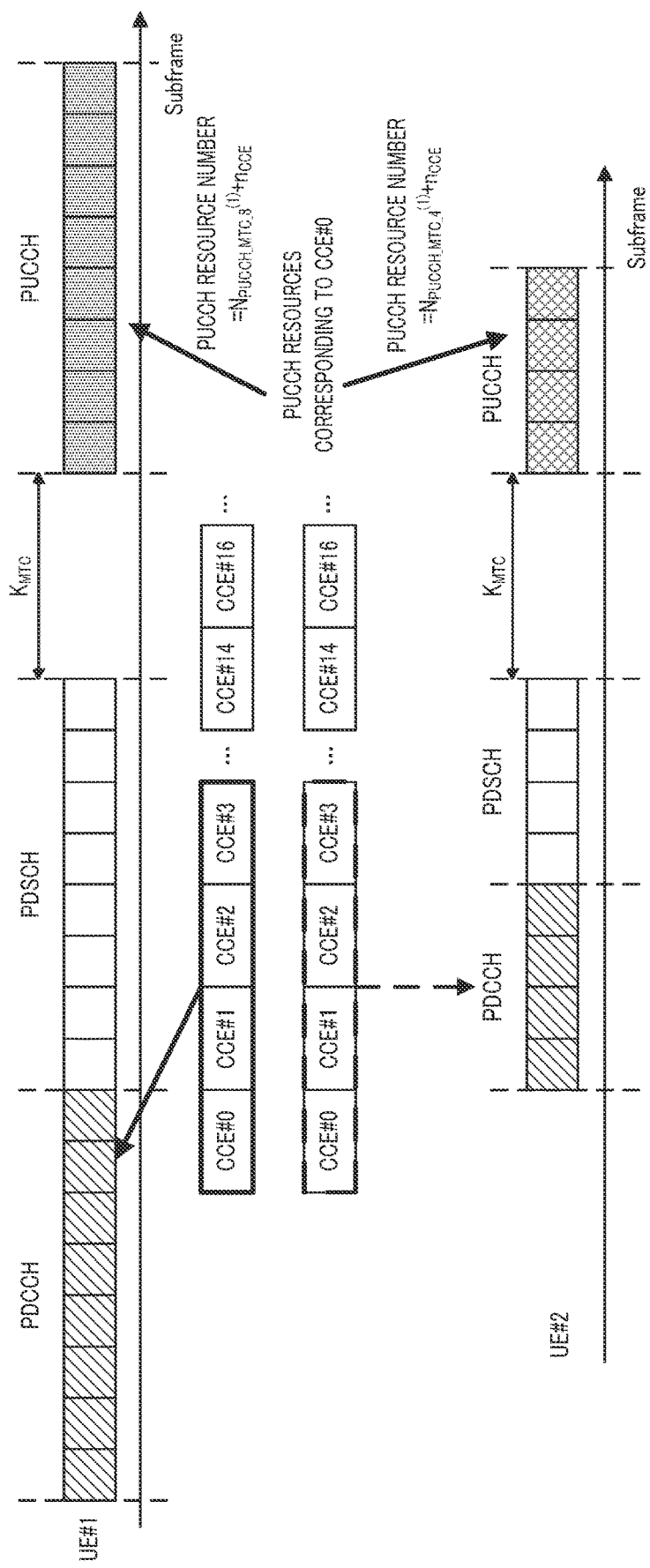
FIG. 18 is a diagram illustrating the transmission timing of each channel according to Embodiment 6.

FIG. 18 illustrates the transmission timing of each channel in Embodiment 6. In FIG. 18, the repetition levels of PDCCH, PDSCH, and PUCCH for terminal 1 (UE #1) are 8, and the repetition levels of PDCCH, PDSCH, and PUCCH for terminal 2 (UE #2) are 4 as in the case of FIG. 17. In addition, in FIG. 18, PDCCH is transmitted to terminal 1 using CCE #0 to CCE #3. Meanwhile, PDCCH is transmitted to terminal 2 using CCE #0 to CCE #3 in the subframe subsequent to the subframe in which the transmission of PDCCH to terminal 1 has been completed.

In this case, as illustrated in FIG. 18, terminal 1 transmits an ACK/NACK signal using a PUCCH resource corresponding to $n_{PUCCH\_MTC\_8} = n_{CCE} + N_{PUCCH\_MTC\_8}^{(1)}$ in accordance with Equation 6 during PUCCH repetition, while terminal 2 transmits an ACK/NACK signal using a PUCCH resource corresponding to $n_{PUCCH\_MTC\_4} = n_{CCE} + N_{PUCCH\_MTC\_4}^{(1)}$ in accordance with Equation 7 during PUCCH repetition.

As described above, $N_{PUCCH\_MTC\_4}^{(1)}$ and $N_{PUCCH\_MTC\_8}^{(1)}$ are different from each other. Thus, as illustrated in FIG. 18, terminals 1 and 2 use mutually different PUCCH resources in the subframes corresponding to the 4 subframes of the top half of PUCCH repetition of terminal 1 and the 4 subframes corresponding to the whole subframes of PUCCH repetition of terminal 2. As a result, no PUCCH resource collision occurs between terminals 1 and 2.

In this manner, even if there occurs a subframe in which ACK/NAC signals are simultaneously transmitted from the MTC coverage enhancement mode terminals which are configured with mutually different repetition levels and to which PDCCH has been transmitted using the same CCE, a PUCCH resource collision in transmission of the ACK/NACK signals from the terminals can be avoided.

It should be noted that, Embodiment 6 may be combined with the operation of Embodiments 1 to 4. In other words, Embodiment 6 may be applied to the method for avoiding a PUCCH resource collision between the MTC coverage enhancement mode terminals, and any one of Embodiments 1 to 4 may be applied to the method for avoiding a PUCCH resource collision between the normal mode terminal and MTC coverage enhancement mode terminal.

Each embodiment of the present disclosure has been described thus far.

Note that, although each embodiment has been described with an example in which an aspect of this disclosure is configured with hardware by way of example, the present disclosure may also be realized by software in concert with hardware.

In addition, the functional blocks used in the description of each embodiment are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A terminal according to the present disclosure includes: a receiving section that receives control information indicating assignment of downlink data, and the downlink data; a control section that determines a resource used for a response signal for the downlink data, based on the control information; and a transmitting section that transmits the response signal using the determined resource, in which: the transmitting section transmits the response signal using a resource in a first resource group when the terminal is a first terminal to which repetition transmission for the control information, the downlink data, and the response signal is applied; and the transmitting section transmits the response signal using a resource in a second resource group when the terminal is a second terminal to which the repetition transmission is not applied, the second resource group being different from the first resource group.

In the terminal according to this disclosure: the control section calculates a resource used for the response signal in the first resource group by adding a first offset value to an index of a control channel element (CCE) used for the control information; the control section calculates a resource used for the response signal in the second resource group by adding a second offset value to the index of the CCE used for the control information; and the first offset value and the second offset value are different.

In the terminal according to the present disclosure: the control section calculates a resource used for the response signal in the first resource group by adding an offset value to an index of a control channel element (CCE) used for the control information; and the control section calculates a resource used for the response signal in the second resource group by subtracting the index of the CCE used for the control information from the offset value.

In the terminal according to the present disclosure: the first resource group and the second resource group each include resources respectively defined by combinations each being of an orthogonal code sequence and a cyclic shift value; and a difference between adjacent cyclic shift values in a single orthogonal code sequence among the combinations defined as the resources of the first resource group is smaller than a difference between adjacent cyclic shift values in a single orthogonal code sequence among the combinations defined as the resources of the second resource group.

In the terminal according to the present disclosure, each resource in the first resource group is associated with a plurality of control channel elements (CCE) used for the control information.

In the terminal according to the present disclosure, a number of the plurality of CCEs is a number of CCEs occupied by the control information.

In the terminal according to the present disclosure: the transmission section transmits the response signal using a resource associated with a control channel element (CCE) used for the control information in the first resource group for a number of subframes corresponding to a number of repetitions for the control information among a plurality of subframes in which the repetition transmission for the response signal is performed; and the transmitting section transmits the response signal using a predetermined resource in a subframe exceeding the number of repetitions for the control information among the plurality of subframes in which the repetition transmission for the response signal is performed.

In the terminal according to the present disclosure, the first resource group includes a plurality of sub-resource groups each configured for a corresponding number of repetitions for the response signal.

A base station according to this disclosure includes: a transmitting section that transmits control information indicating assignment of downlink data, and the downlink data; a control section that determines a resource used for a response signal for the downlink data, based on the control information; and a receiving section that receives the response signal using the determined resource, in which: the receiving section receives, using a resource in a first resource group, the response signal transmitted from a first terminal to which repetition transmission for the control information, the downlink data, and the response signal is applied; and the receiving section receives, using a resource in a second resource group, the response signal transmitted from a second terminal to which the repetition transmission is not applied, the second resource group being different from the first resource group.

A transmitting method according to this disclosure includes: receiving control information indicating assignment of downlink data, and the downlink data; determining a resource used for a response signal for the downlink data, based on the control information; and transmitting the response signal using the determined resource, in which: in the transmitting of the response signal, the response signal is transmitted using a resource in a first resource group from a first terminal to which repetition transmission for the control information, the downlink data, and the response signal is applied; and in the transmitting of the response signal, the response signal is transmitted using a resource in a second resource group from a second terminal to which the repetition transmission is not applied, the second resource group being different from the first resource group.

A receiving method according to this disclosure includes: transmitting control information indicating assignment of downlink data, and the downlink data; determining a resource used for a response signal for the downlink data, based on the control information; and receiving the response signal using the determined resource, in which: in the receiving of the response signal, the response signal transmitted from a first terminal is received using a resource in a first resource group, the first terminal being a terminal to which repetition transmission for the control information, the downlink data, and the response signal is applied; and in the receiving of the response signal, the response signal transmitted from a second terminal is received using a resource in a second resource group that is different from the first resource group, the second terminal being a terminal to which the repetition transmission is not applied.

INDUSTRIAL APPLICABILITY

An aspect of the present disclosure is useful in mobile communication systems.

REFERENCE SIGNS LIST

100 Base station
200 Terminal
101, 213 Control section
102 Control signal generating section
103 Control signal coding section
104 Control signal modulation section
105 Broadcast signal generating section
106 Data coding section
107 Retransmission control section
108 Data modulation section
109 Signal assignment section
110, 218 IFFT section
111, 219 CP adding section
112, 220 Transmitting section
113 Antenna
114, 202 Receiving section
115, 203 CP removing section
116 PUCCH extracting section
117 Sequence control section
118 Despreading section
119 Correlation processing section
120, 209 Determination section
204 FFT section
205 Extracting section
206 Broadcast signal receiving section
207 Control signal demodulation section
208 Control signal decoding section
210 Data demodulation section
211 Data decoding section
212 CRC section
214 ACK/NACK generating section
215 Modulation section
216 Primary-spreading section
217 Secondary-spreading section

The invention claimed is:

1. An integrated circuit to control a process for a terminal, the process comprising:
receiving downlink control information and downlink data;
determining, based on the downlink control information and an offset, a physical uplink control channel (PUCCH) resource used for transmission of a response signal for the downlink data; and
transmitting the response signal using the determined PUCCH resource,
wherein:
a first offset is used as the offset when the terminal is configured in a coverage enhancement mode, in which the response signal is allowed to be transmitted repeatedly for one of plural repetition levels in a plurality of subframes, where the first offset is configured for each of the plural repetition levels; and
the first offset is different from a second offset, which is used when the terminal is not configured in the coverage enhancement mode.

2. The integrated circuit according to claim 1, comprising:
circuitry which, in operation, controls the process;
at least one input coupled to the circuitry, wherein the at least one input, in operation, inputs data; and
at least one output coupled to the circuitry, wherein the at least one output, in operation, outputs data.

3. The integrated circuit according to claim 1, wherein the receiving includes receiving the downlink control information transmitted across a plurality of subframes in the coverage enhancement mode.

4. The integrated circuit according to claim 1, wherein:
a combination of one of orthogonal sequences and one of cyclic shifts is determined from an association of the PUCCH resource with the combination; and
a first association in the coverage enhancement mode is different from a second association, which is used when the terminal is not configured in the coverage enhancement mode.

5. The integrated circuit according to claim 4, wherein the association is based on a difference between adjacent cyclic shifts that are combined with one of the orthogonal sequences, and the difference of the first association in the coverage enhancement mode is configured independently of the difference of the second association, which is used when the terminal is not configured in the coverage enhancement mode.

6. The integrated circuit according to claim 1, wherein the transmitting includes transmitting the response signal repeatedly spanning a plurality of subframes in the coverage enhancement mode.

7. The integrated circuit according to claim 1, wherein the transmitting includes transmitting the response signal k subframes after the last subframe in which the downlink data is received in the coverage enhancement mode, where k is an integer.

8. The integrated circuit according to claim 1, wherein the first offset is specific to the terminal, and the second offset is common in a cell.

9. The integrated circuit according to claim 1, wherein the first offset is common to terminals configured in the coverage enhancement mode.

10. The integrated circuit according to claim 1, the process comprises receiving at least one of the first offset and the second offset, which is configured by a higher layer.

11. The integrated circuit according to claim 1, wherein the receiving includes receiving the downlink data transmitted repeatedly spanning a plurality of subframes in the coverage enhancement mode.

12. An integrated circuit comprising circuitry, which, in operation:
controls reception of downlink control information and downlink data;
determines, based on the downlink control information and an offset, a physical uplink control channel (PUCCH) resource used for transmission of a response signal for the downlink data; and
controls transmission of the response signal using the determined PUCCH resource, wherein:
a first offset is used as the offset when a terminal is configured in a coverage enhancement mode, in which the response signal is allowed to be transmitted repeatedly for one of plural repetition levels in a plurality of subframes, where the first offset is configured for each of the plural repetition levels; and
the first offset is different from a second offset, which is used when the terminal is not configured in the coverage enhancement mode.

13. The integrated circuit according to claim 12, comprising:
at least one input coupled to the circuitry, wherein the at least one input, in operation, inputs data; and
at least one output coupled to the circuitry, wherein the at least one output, in operation, outputs data.

14. The integrated circuit according to claim 12, wherein the reception includes reception of the downlink control information transmitted across a plurality of subframes in the coverage enhancement mode.

15. The integrated circuit according to claim 12, wherein:
a combination of one of orthogonal sequences and one of cyclic shifts is determined from an association of the PUCCH resource with the combination; and
a first association in the coverage enhancement mode is different from a second association, which is used when the terminal is not configured in the coverage enhancement mode.

16. The integrated circuit according to claim 15, wherein the association is based on a difference between adjacent cyclic shifts that are combined with one of the orthogonal sequences, and the difference of the first association in the coverage enhancement mode is configured independently of the difference of the second association, which is used when the terminal is not configured in the coverage enhancement mode.

17. The integrated circuit according to claim 12, wherein the transmission includes transmission of the response signal repeatedly spanning a plurality of subframes in the coverage enhancement mode.

18. The integrated circuit according to claim 12, wherein the transmission includes transmission of the response signal k subframes after the last subframe in which the downlink data is received in the coverage enhancement mode, where k is an integer.

19. The integrated circuit according to claim 12, wherein the first offset is specific to the terminal, and the second offset is common in a cell.

20. The integrated circuit according to claim 12, wherein the first offset is common to terminals configured in the coverage enhancement mode.

21. The integrated circuit according to claim 12, wherein the circuitry, in operation, controls reception of at least one of the first offset and the second offset, which is configured by a higher layer.

22. The integrated circuit according to claim 12, wherein the reception includes reception of the downlink data transmitted repeatedly spanning a plurality of subframes in the coverage enhancement mode.

* * * * *